US008471194B2

(12) United States Patent
Dolenti et al.

(10) Patent No.: US 8,471,194 B2
(45) Date of Patent: Jun. 25, 2013

(54) ROTARY ENCODER FOR DIAGNOSING PROBLEMS WITH ROTARY EQUIPMENT

(75) Inventors: William T. Dolenti, Lynchburg, VA (US); Byron A. Fleury, Lynchburg, VA (US); Daniel J. Morris, Forest, VA (US); William C. Hooss, Lynchburg, VA (US)

(73) Assignee: Flowserve Management Company, Irving, TX (US)

( * ) Notice: Subject to any disclaimer, the term of this patent is extended or adjusted under 35 U.S.C. 154(b) by 474 days.

(21) Appl. No.: 12/226,625

(22) PCT Filed: Apr. 21, 2006

(86) PCT No.: PCT/US2006/015174
§ 371 (c)(1),
(2), (4) Date: Apr. 24, 2009

(87) PCT Pub. No.: WO2007/123522
PCT Pub. Date: Nov. 1, 2007

(65) Prior Publication Data
US 2010/0001177 A1    Jan. 7, 2010

(51) Int. Cl.
*G01D 5/34* (2006.01)

(52) U.S. Cl.
USPC .................................................. 250/231.13

(58) Field of Classification Search
USPC ... 250/231.13–231.19; 356/614–622; 341/13, 341/14
See application file for complete search history.

(56) References Cited

U.S. PATENT DOCUMENTS

| | | | |
|---|---|---|---|
| 3,259,023 A | 7/1966 | Rieger et al. | |
| 3,299,697 A | 1/1967 | Sparling | |
| 3,571,834 A | 3/1971 | Mathias | |
| 3,747,085 A | 7/1973 | Bala et al. | |
| 4,524,812 A | 6/1985 | Murphy | |
| 4,730,110 A | 3/1988 | Spaulding | |
| 4,965,513 A | 10/1990 | Haynes et al. | |
| 5,049,815 A | 9/1991 | Kliman | |
| 5,365,787 A | 11/1994 | Hernandez et al. | |
| 5,418,362 A * | 5/1995 | Lusby et al. ............. | 250/231.18 |
| 5,565,861 A | 10/1996 | Mettler et al. | |
| 5,574,646 A | 11/1996 | Kawasaki et al. | |
| 5,640,007 A | 6/1997 | Talbott et al. | |
| 6,602,109 B1 | 8/2003 | Malkin et al. | |
| 6,615,697 B2 | 9/2003 | Nakagawa | |
| 7,184,930 B2 | 2/2007 | Miyasaka et al. | |
| 7,633,256 B2 | 12/2009 | Reichert et al. | |

(Continued)

FOREIGN PATENT DOCUMENTS

| | | |
|---|---|---|
| CA | 2298060 C | 8/2000 |
| CN | 1554151 A | 12/2004 |

(Continued)

OTHER PUBLICATIONS

International Search Report for PCT/US06/15174, mailed Feb. 13, 2007, 3 pages.

(Continued)

*Primary Examiner* — Thanh Luu
(74) *Attorney, Agent, or Firm* — TraskBritt

(57) ABSTRACT

A novel method for diagnosing problems with a valve actuator or other rotary equipment. Frequency analysis is performed upon speed, position, torque, thrust, or vibration data. Speed or position data may be provided by a rotary encoder.

23 Claims, 13 Drawing Sheets

U.S. PATENT DOCUMENTS

| | | |
|---|---|---|
| 7,757,556 B2 | 7/2010 | Linzenkirchner et al. |
| 2003/0019297 A1 | 1/2003 | Fiebelkorn et al. |
| 2005/0160980 A1* | 7/2005 | Khoury et al. ............... 118/668 |
| 2006/0049964 A1* | 3/2006 | Berthou ....................... 341/13 |
| 2006/0069523 A1 | 3/2006 | Kanekawa et al. |
| 2006/0071666 A1 | 4/2006 | Unsworth et al. |
| 2006/0174707 A1 | 8/2006 | Zhang |

FOREIGN PATENT DOCUMENTS

| | | |
|---|---|---|
| DE | 9208470 U1 | 10/1992 |
| DE | 4220502 C1 | 12/1993 |
| DE | 10025160 A1 | 12/2001 |
| DE | 10047924 A1 | 4/2002 |
| DE | 102004015038 A1 | 10/2005 |
| EP | 1548419 A1 | 6/2005 |
| JP | 59-020534 | 2/1984 |
| JP | 05-018477 | 1/1993 |
| JP | 06-300667 | 10/1994 |
| JP | 10-201739 | 8/1998 |
| JP | 2002-174549 | 6/2002 |
| JP | 2005-003672 | 1/2005 |
| JP | 2005-188297 | 7/2005 |
| WO | 96/15401 | 5/1996 |

OTHER PUBLICATIONS

International Search Report for International Application No. PCT/US06/15416, mailed Feb. 9, 2007, 3 pages.
International Preliminary Report on Patentability for International Application No. PCT/US2006/015174, dated Oct. 21, 2008.
Written Opinion for International Application No. PCT/US2006/015174, dated Feb. 13, 2007.
International Preliminary Report on Patentability for International Application No. PCT/US2006/015416, dated Oct. 21, 2008.
Written Opinion for International Application No. PCT/US2006/015416, dated Feb. 9, 2007.
United Kingdom combined Search and Examination Report for Application No. GB1111014.5, dated Jul. 22, 2011, 4 pages.
Combined Search and Examination Report for Great Britain Application No. GB1109126.1, dated Jun. 17, 2011, 4 pages.

* cited by examiner

| Speed DS (rpm) | Speed DS (Hz) | Bevel Set Speed multiplier | Input wheel 10 speed multiplier | rpm @ timing wheel 20 | Incr pulse freq (Hz) | Nyquist freq (Hz) | Stroke time (sec) | Samples per stroke | FFT Usable samples per stroke | accuracy |
|---|---|---|---|---|---|---|---|---|---|---|
| 200 | 3.33 | 4.78 | 1.34 | 1280 | 683 | 341 | 10 | 6825.5 | 4096 | 99.941% |
| 155 | 2.58 | 4.78 | 1.34 | 992 | 529 | 264 | 10 | 5289.8 | 4096 | 99.924% |
| 100 | 1.67 | 4.78 | 1.34 | 640 | 341 | 171 | 10 | 3412.8 | 2048 | 99.883% |
| 77 | 1.28 | 4.78 | 1.34 | 493 | 263 | 131 | 10 | 2627.8 | 2048 | 99.848% |
| 52 | 0.87 | 4.78 | 1.34 | 333 | 177 | 89 | 10 | 1774.6 | 1024 | 99.775% |
| 40 | 0.67 | 4.78 | 1.34 | 256 | 137 | 68 | 10 | 1365.1 | 1024 | 99.707% |
| 26 | 0.43 | 4.78 | 1.34 | 166 | 89 | 44 | 10 | 887.3 | 512 | 99.549% |
| 18 | 0.30 | 4.78 | 1.34 | 115 | 61 | 31 | 10 | 614.3 | 512 | 99.349% |
| 15 | 0.25 | 4.78 | 1.34 | 96 | 51 | 26 | 10 | 511.9 | 0 | 99.219% |
| 200 | 3.33 | 4.78 | 1.34 | 1280 | 683 | 341 | 15 | 10238.3 | 8192 | 99.961% |
| 155 | 2.58 | 4.78 | 1.34 | 992 | 529 | 264 | 15 | 7934.7 | 4096 | 99.950% |
| 100 | 1.67 | 4.78 | 1.34 | 640 | 341 | 171 | 15 | 5119.1 | 4096 | 99.922% |
| 77 | 1.28 | 4.78 | 1.34 | 493 | 263 | 131 | 15 | 3941.7 | 2048 | 99.899% |
| 52 | 0.87 | 4.78 | 1.34 | 333 | 177 | 89 | 15 | 2662.0 | 2048 | 99.850% |
| 40 | 0.67 | 4.78 | 1.34 | 256 | 137 | 68 | 15 | 2047.7 | 1024 | 99.805% |
| 26 | 0.43 | 4.78 | 1.34 | 166 | 89 | 44 | 15 | 1331.0 | 1024 | 99.699% |
| 18 | 0.30 | 4.78 | 1.34 | 115 | 61 | 31 | 15 | 921.4 | 512 | 99.566% |
| 15 | 0.25 | 4.78 | 1.34 | 96 | 51 | 26 | 15 | 767.9 | 512 | 99.479% |
| 200 | 3.33 | 4.78 | 1.34 | 1280 | 683 | 341 | 30 | 20476.6 | 16384 | 99.980% |
| 155 | 2.58 | 4.78 | 1.34 | 992 | 529 | 264 | 30 | 15869.3 | 8192 | 99.975% |
| 100 | 1.67 | 4.78 | 1.34 | 640 | 341 | 171 | 30 | 10238.3 | 8192 | 99.961% |
| 77 | 1.28 | 4.78 | 1.34 | 493 | 263 | 131 | 30 | 7883.5 | 4096 | 99.949% |
| 52 | 0.87 | 4.78 | 1.34 | 333 | 177 | 89 | 30 | 5323.9 | 4096 | 99.925% |
| 40 | 0.67 | 4.78 | 1.34 | 256 | 137 | 68 | 30 | 4095.3 | 2048 | 99.902% |
| 26 | 0.43 | 4.78 | 1.34 | 166 | 89 | 44 | 30 | 2662.0 | 2048 | 99.850% |
| 18 | 0.30 | 4.78 | 1.34 | 115 | 61 | 31 | 30 | 1842.9 | 1024 | 99.783% |
| 15 | 0.25 | 4.78 | 1.34 | 96 | 51 | 26 | 30 | 1535.7 | 1024 | 99.740% |
| 200 | 3.33 | 4.78 | 1.34 | 1280 | 683 | 341 | 60 | 40953.1 | 32768 | 99.990% |
| 155 | 2.58 | 4.78 | 1.34 | 992 | 529 | 264 | 60 | 31738.7 | 16384 | 99.987% |
| 100 | 1.67 | 4.78 | 1.34 | 640 | 341 | 171 | 60 | 20476.6 | 16384 | 99.980% |
| 77 | 1.28 | 4.78 | 1.34 | 493 | 263 | 131 | 60 | 15767.0 | 8192 | 99.975% |
| 52 | 0.87 | 4.78 | 1.34 | 333 | 177 | 89 | 60 | 10647.8 | 8192 | 99.962% |
| 40 | 0.67 | 4.78 | 1.34 | 256 | 137 | 68 | 60 | 8190.6 | 4096 | 99.951% |
| 26 | 0.43 | 4.78 | 1.34 | 166 | 89 | 44 | 60 | 5323.9 | 4096 | 99.925% |
| 18 | 0.30 | 4.78 | 1.34 | 115 | 61 | 31 | 60 | 3685.8 | 2048 | 99.891% |
| 15 | 0.25 | 4.78 | 1.34 | 96 | 51 | 26 | 60 | 3071.5 | 2048 | 99.870% |

*FIG. 15*

ROTARY ENCODER FOR DIAGNOSING PROBLEMS WITH ROTARY EQUIPMENT

TECHNICAL FIELD

The invention relates generally to analysis of valve actuators and rotary position encoders, and more particularly to performing frequency analysis of valve actuators and to rotary position encoders with a built-in-self-test.

BACKGROUND

In many applications, it is necessary to measure the position of a rotary shaft of a rotational device. However, rotational devices are often complex and have parts that are difficult to access. Furthermore, rotational devices are often integrated into industrial processes where the cost of stopping the process to repair the rotational device often far exceeds the cost of the rotational device. Rotary valves, for example, often are critical to industrial processes and repair of some parts of the valves require shutting down the process. A need exists to identify precisely the position of a rotary shaft and objects driven by the rotary shaft, such as a valve stem. A need also exists to identify any wearing parts in a rotational device, such as a valve, so that preventative maintenance can be performed at scheduled shutdowns, or so that the rotational device can be operated in such a way as to keep the device operational until the next scheduled shutdown. A need exists for a device capable of both determining the position of a rotary shaft as well as identifying the severity and location of problems within the rotational device to which the rotary shaft is connected.

One approach to diagnosing rotating devices has employed frequency analysis. Cyclic data may be analyzed with a Fourier Transform (FT) algorithm to transform the data from a time domain to a frequency domain. One attempt to apply FT to motor operated valves involved measuring the current flowing to the motor, applying FT to the motor data, and then using peaks in the frequency spectrum to diagnose problems in the drive-train of the valve actuator. However, this approach does not measure the rotational speed of a shaft nor does it determine the position of a rotary shaft. A motor current-measuring device also does not integrate into a device capable of determining the position of a rotary shaft.

One approach to measuring the position of a rotary member involves a rotary encoder. Rotary encoders include incremental and absolute encoders. Incremental encoders are used to measure the rotational change of a shaft. A basic incremental encoder includes a disk with a large number of radial painted lines. A photodiode or other sensor generates an electrical pulse whenever a painted line is sensed. A computer, or other processor, tracks the pulses to determine the position of the disk and, in turn, the position of the shaft to which the disk is attached. With incremental encoders, if power is lost to the computer, the position information is lost when power is restored. Previous incremental encoders for valve actuators have included a speed sensor, but the speed sensor and resulting data have not been used for frequency analysis.

Absolute encoders do not require a power supply to maintain position information. Absolute encoders produce a unique digital code for each distinct angle of a rotary shaft. Absolute encoders can be a single wheel with a complex pattern machined into the wheel. The single wheel is attached to the shaft in question and numerous distinct angular positions can be identified by the patterns on the wheel. However, such wheels are only useful where a shaft will undergo only a single rotation.

Another version of the absolute encoder utilizes multiple wheels with concentric rings on each of the wheels, where each ring provides 1-bit of position data. The multi-wheel version allows the measured shaft to undergo numerous rotations and still track the position and number of rotations of the shaft. The presence of more wheels allows tracking of more shaft rotation or determination of more positions for a single rotation. However, multi-wheel absolute encoders are often delicate and less reliable. It would be desirable to have a multi-wheel absolute encoder that is reliable and operable to generate speed data for use in frequency analysis.

One attempt to solve this problem utilizes either 6 or 7 wheels. Each wheel provides 3-bits of data. However, only 2-bits of Gray code are generated as position data via v-bit processing. This increases the reliability of the absolute encoder. However, duplicate sensors are not used. Additionally, a speed sensor is not integrated into the absolute encoder and speed data is not generated for use in frequency analysis.

DISCLOSURE

One embodiment of the invention includes rotary encoder for use with a rotary device. The rotary encoder comprises one or more encoding wheels, each of the one or more encoding wheels comprising at least one coding section operable to encode a position of the rotary device. Also included is at least one double set of sensors operable to monitor the at least one coding section.

Another embodiment of the invention includes a valve actuator comprising an absolute encoder and a drive-train adapted to drive the absolute encoder. The absolute encoder comprises at least one encoder disk, a plurality of sensors operable to read the at least one encoder disk, a speed sensor operable to generate speed data; at least one duplicate sensor for each of the plurality of sensors and the speed sensor.

Yet another embodiment of the invention includes a method of analyzing a valve actuator including a sensor. The method comprises generating data from the sensor and performing frequency domain analysis on the data.

A particular embodiment of the invention includes a method of analyzing a rotating device that rotates between two position limits. The method comprises operably coupling a rotary position encoder to a shaft of the rotating device, where the rotary position encoder includes a speed indicator. The method includes generating speed data with the speed sensor and performing frequency analysis on the speed data.

The features, advantages, and alternative aspects of the present invention will be apparent to those skilled in the art from a consideration of the following detailed description taken in combination with the accompanying drawings.

BRIEF DESCRIPTION OF DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

FIG. 15 is a table indicating the accuracy of some embodiments of the present invention;

BEST MODE(S) FOR CARRYING OUT THE INVENTION

The present invention may be used with any valve actuator or other rotary equipment, such as equipment that rotates between two positions. A particular embodiment of the present invention utilizes a rotary encoder with an integrated speed sensor. The speed sensor is operable to generate speed data for frequency analysis. The present invention also may use another type of sensor able to generate data transformable into the frequency domain. The frequency analysis may, in turn, be used to diagnose any problems with the valve actuator or other rotary equipment. In one embodiment, the rotary encoder is an absolute encoder with duplicate sensor pairs.

Figure 1:
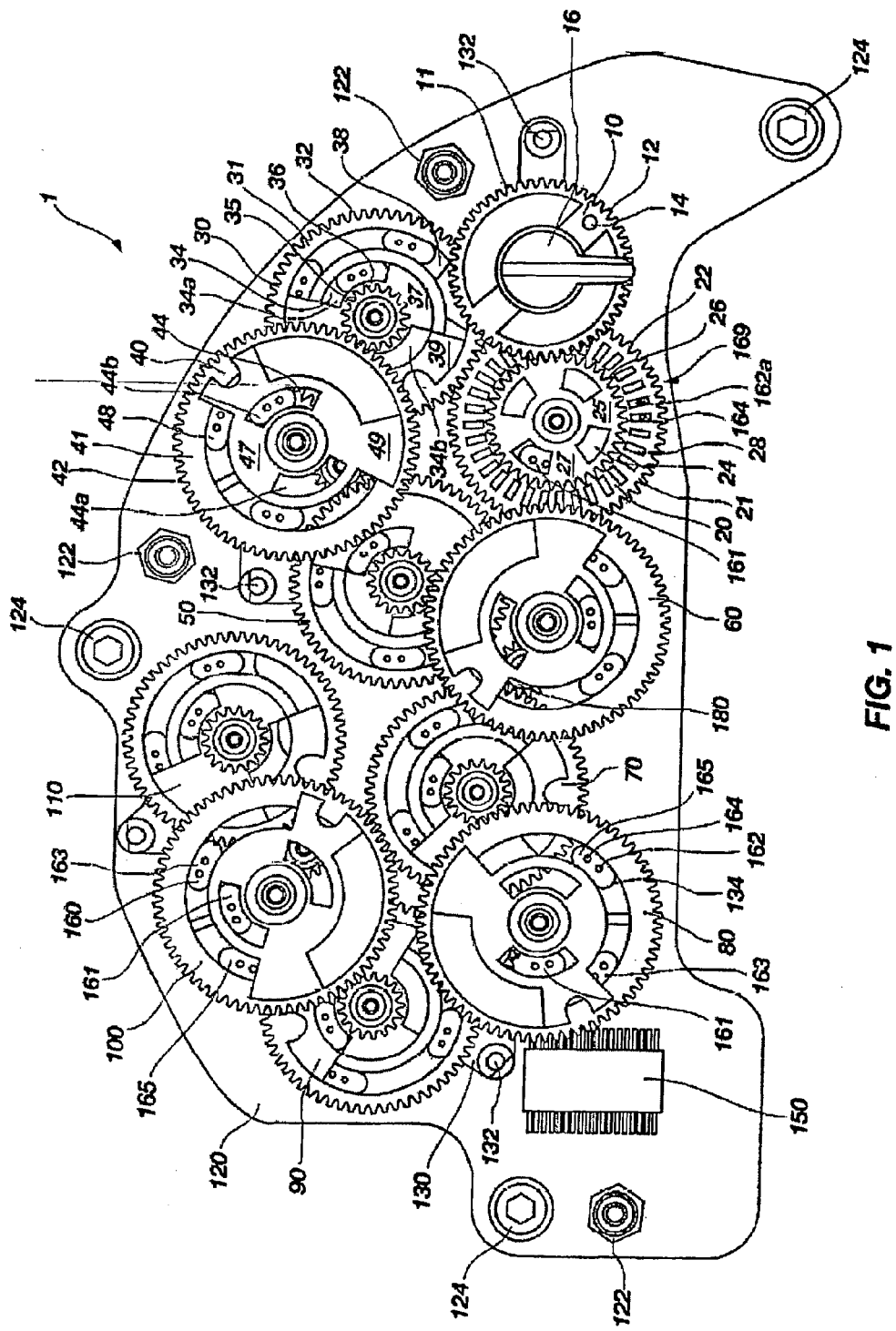
FIG. 1 illustrates the wheels of one embodiment of a rotary encoder.

In the figures, like numerals represent like elements. FIG. 1 illustrates one embodiment of a rotary encoder of the present invention. Rotary encoder 1 represents a particular embodiment of an absolute encoder. The terms "wheel" or "wheels" without a modifier such as "input," "timing," or "encoding" may apply to input wheel 10, timing wheel 20, and encoding wheels 30, 40, 50, 60, 70, 80, 90, 100, 110. The phrase "encoding wheel" or "encoding wheels" applies to encoding wheels 30 through 110.

Bottom mounting rack 130 is secured to bottom board 120 via bolts 132. Bolts 132 may also be rivets, screws, clamps, clips, adhesives, weld points, a snap-fit junction, or any other connection means known in the art. Bolts 132 may also be placed at any location. For example, when bolt 132 is a clamp, bottom mounting rack 130 may extend to the edge of bottom board 120 and bolt 132 may be located at that edge. Alternatively, when bolt 132 is an adhesive, the adhesive may be spread across any surface of bottom mounting rack 130 that is in contact with bottom board 120.

Bottom board 120 can include a semiconductor substrate where electrical components, such as a processor 150 and sensor 160, may be integrated with each other. The circuits connecting processor 150 and sensor 160 are not shown. However, rather than integrating the circuits into bottom board 120, the circuits can be positioned external to bottom board 120. For example, holes can be drilled in bottom board 120 to correspond with the inputs and outputs of sensors 160 and the inputs and outputs of processor 150. The insulated wires can be interconnected between the sensors 160 and the processor 150. Additionally, if circuitry is positioned external to bottom board 120, it may be desirable to incorporate bottom mounting rack 130 into bottom board 120.

Figure 2:
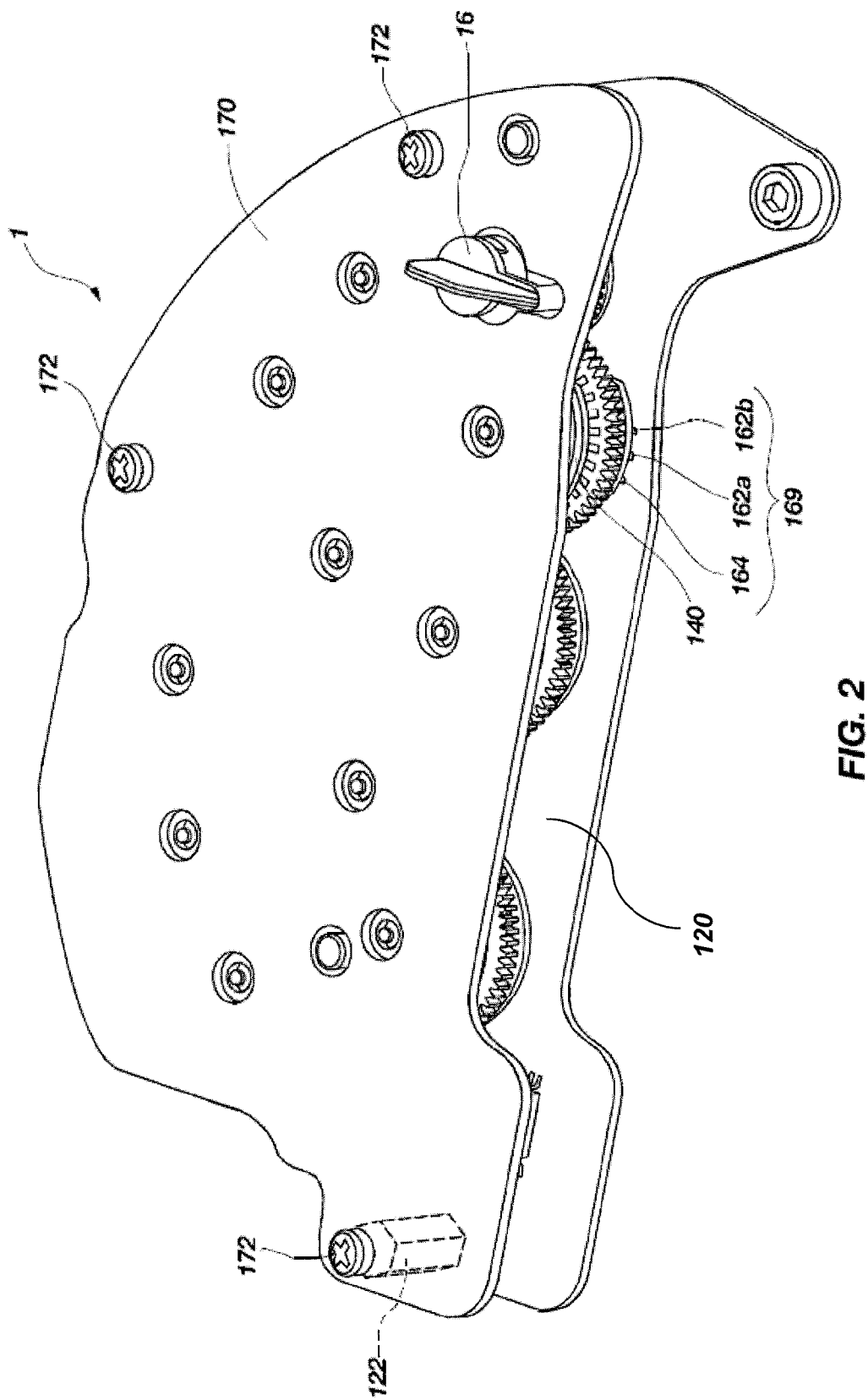
FIG. 2 illustrates a fully-assembled version of the embodiment of FIG. 1.
Figure 3:
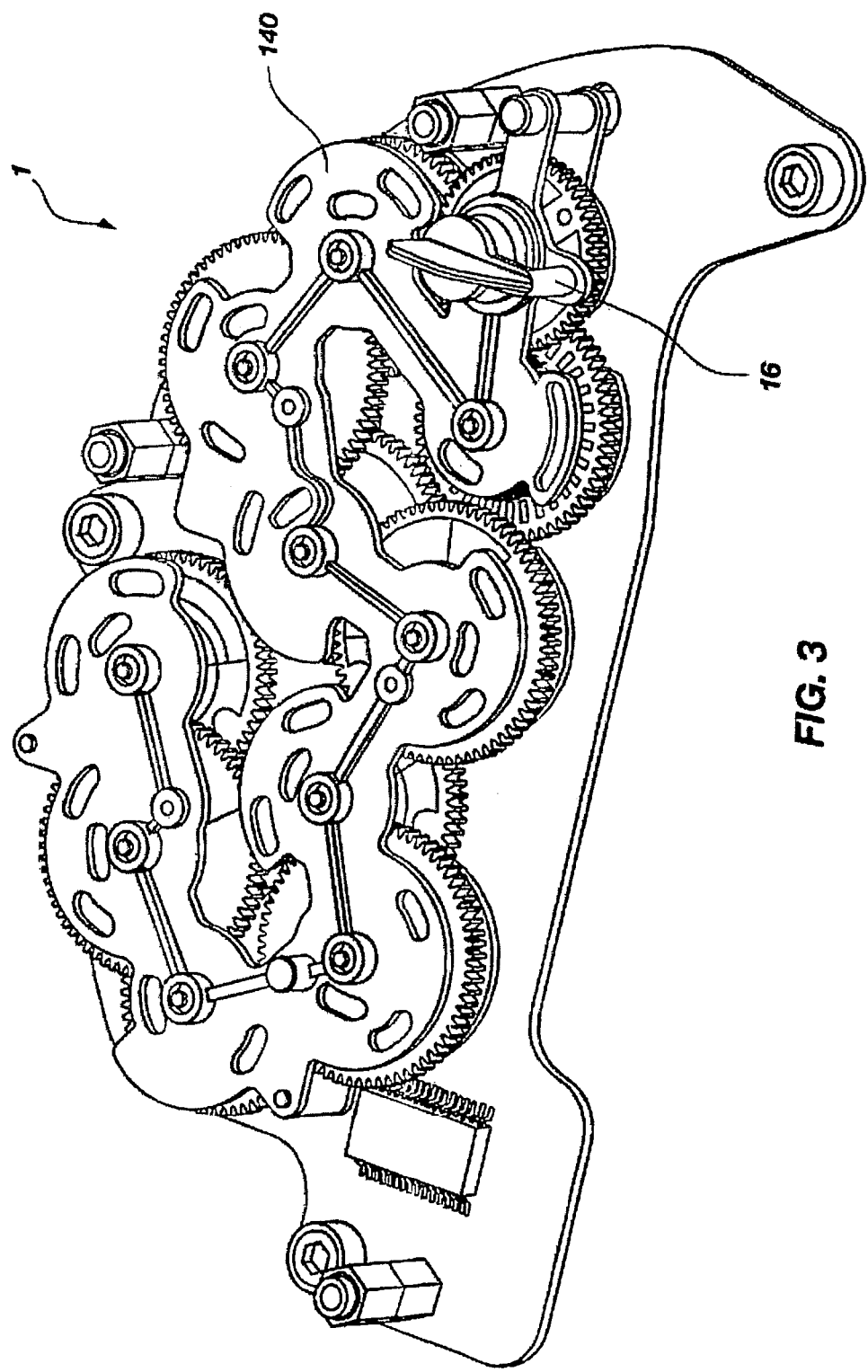
FIG. 3 illustrates a partially-assembled version of the embodiment of FIG. 1.
Figure 4:
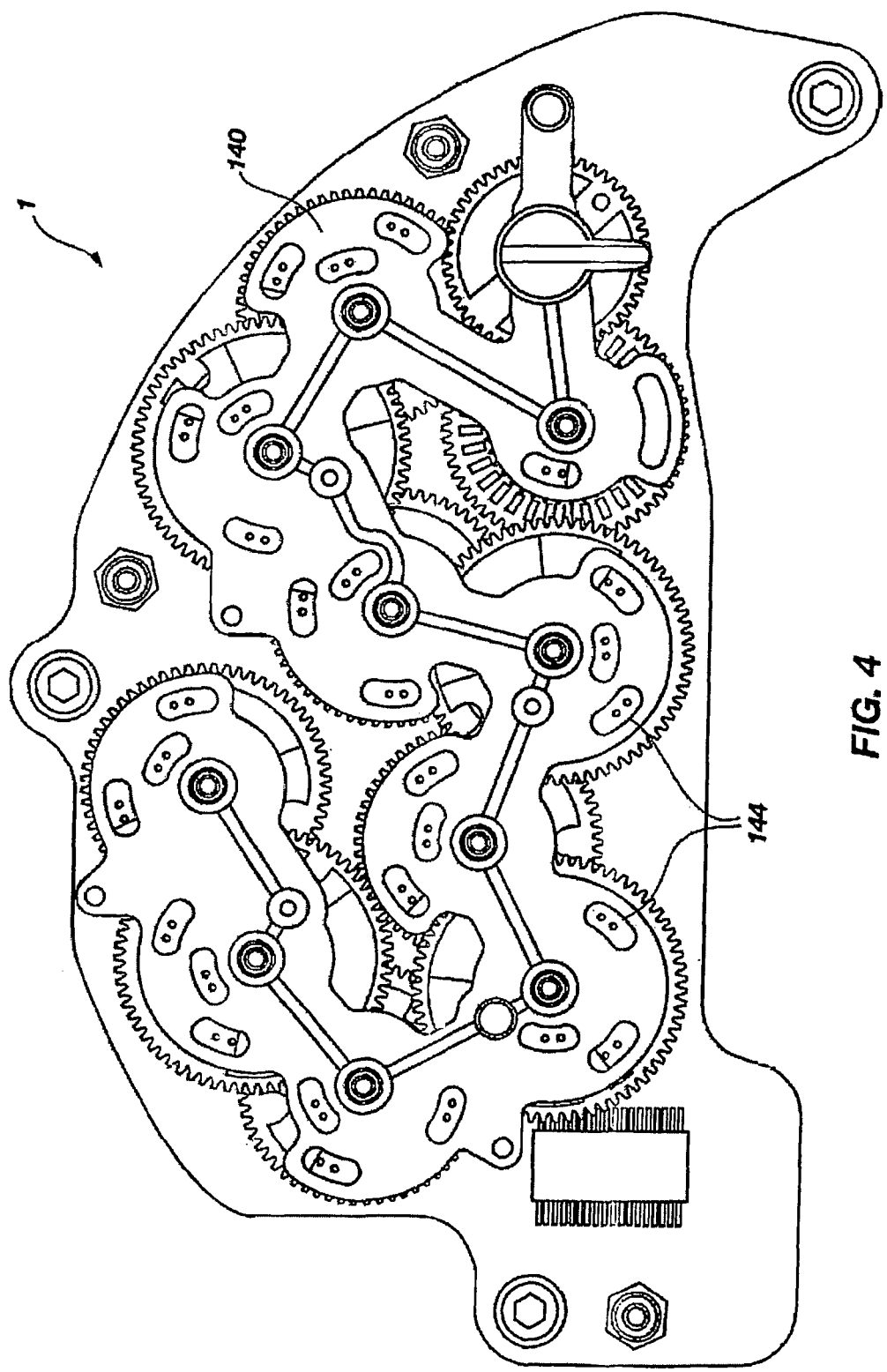
FIG. 4 illustrates a top-view of the embodiment of FIG. 3.

Rotary encoder 1 also can include top mounting rack 140 and top board 170, shown in FIGS. 2 through 4. The same description regarding bottom board 120 and bottom mounting rack 130 apply to top mounting rack 140 and top board 170. Top board 170 can also be a semiconductor substrate. However, any circuitry may be external to top board 170, as well. Top mounting rack 140 also may be integrated within top board 170. Top mounting rack 140 can be secured to bottom mounting rack 130 with bolts 132. Securing nut 122 is attached to bottom board 120. Top board 170 is secured to bottom board 120 via screw 172 and securing nut 122, as shown in FIG. 2. Rotary encoder 1 may be secured to another device via mounting bolts 124. The configurations described with respect to bolts 132 also may apply to securing nuts 122, screws 172, and mounting bolts 124. As shown in FIGS. 3 and 4, top mounting rack 140 may be a single piece of material. This allows the embodiment of top mounting rack 140, shown in FIGS. 3 and 4, to thermally expand in a even manner. The same applies for bottom mounting rack 130. In an alternative embodiment, top mounting rack 140 and bottom mounting rack 130 may each be made of multiple pieces.

Additionally, the rotary encoder 1 is not limited to any particular shape. Rotary encoder 1 may be circular, rectangular, or specifically shaped for a certain device or application. Also, the terms "top" and "bottom" are used herein only to facilitate description of rotary encoder 1. Thus, rotary encoder 1 may be used in any orientation.

In the particular example of FIGS. 1-4, the input wheel 10 includes teeth 12 on gear 11. Input wheel 10 also includes aperture 14, which may be used with sensors to provide a means for tracking the number of rotations of input wheel 10. Locking cap 16 is attached to input wheel 10. As shown in FIG. 3, when locking cap 16 is in place, any movement of input wheel 10 is restrained by the contact of locking cap 16 with top mounting bracket 140. Locking cap 16 may be included whenever rotary encoder 1 is to be handled or shipped, and then removed once an inputshaft is ready to engage rotary encoder 1.

Timing wheel 20 includes gear 21 and pinion 25. Gear 21 includes teeth 22. Pinion 25 includes teeth 26. Timing wheel 20 also contains timing slits 28. In this embodiment, timing slits 28 are designed as holes that extend from the top surface of gear 21 to the bottom surface of gear 21 and timing slits 28 are designed as arcuate sections that appear as rectangular. However, it is understood that these elements may be of any shape. Timing slits 28 may also be paint lines, embedded magnets, or any other structure capable of being detected. Timing slits 28 also may not be present and, instead, other devices may perform the function of timing slits 28. For example, the teeth on gear 21 may be made from a ferrous compound and include a sufficient number to correspond to the desired timing marks 28. A magnetic pick-up placed close to the gear 21 can sense each tooth 22 that rotates proximate to the magnetic pick-up. Timing wheel 20 represents just one embodiment of a timing mechanism that may be used with the present invention.

Timing wheel 20 also includes coding sections 24, which in the present embodiment are designed as arcuate holes extending from the top surface of pinion 25 through the bottom of gear 21. FIG. 1 illustrates coding sections 24 as terminating in straight edges in-line with rays extending radially from the center of timing wheel 20. Coding sections 24 may also be arcuate sections that end in concave edges similar to the concave edges of gaps 134 and gaps 144. Coding sections 24 are shown as dividing inner ring 27 of timing wheel 20 into eighths. However, coding sections 24 may be designed to divide inner ring 27 into half, quarter, sixteenths, or any other ½″ fraction.

In the illustrated embodiment of FIG. 1, encoding wheel 30 includes gear 31, which includes teeth 32 and pinion 35, which includes teeth 36. Encoding wheel 30 has an inner ring 37, which contains coding section 34, and an outer ring 39, which contains coding section 38. Coding sections 34 and 38 extend from the top surface of encoding wheel 30 to the bottom surface of wheel 30. Coding section 38 has a continuous arcuate shape that occupies one-half of outer ring 39. Coding section 34 includes two different arcuate sections, section 34a and section 34b, which each occupy one-quarter of the inner ring 37 and are equally spaced from each other. Section 34a begins at the same radial ray as coding section 38. Section 34b begins at the same radial ray where coding section 38 terminates. Coding sections may be asymmetrical, as shown in FIG. 1, or symmetrical, such as the coding sections of FIG. 5. Asymmetrical orientation of the coding sections may facilitate placement of redundant sensors on bottom board 120 in locations that will not be blocked by non-coding section portions of the encoding wheels.

Encoding wheel 40 includes gear 41, which includes teeth 42, and a pinion, which includes teeth (not shown). The pinion is mounted on the underside of encoding wheel 40 and is not shown in the figures. Encoding wheel 40 has an inner ring 47, which contains coding section 44, and an outer ring 49, which contains coding section 48. Coding sections 44 and 48 extend from the top surface of encoding wheel 40 to the bottom surface of wheel 40. Coding section 48 includes a continuous arcuate section that occupies one-half of outer ring 49. Coding section 44 is divided into two arcuate sections, section 44a and section 44b, each of which occupy one-quarter of the inner ring 47 and are equally spaced from each other. Section 44a begins at the same radial ray as coding section 48. Section 44b begins at the same radial ray where section 48 terminates.

In the present embodiment, encoding wheels 50, 70, 90, and 110 are identical to encoding wheel 30, and encoding wheels 60, 80, and 100 are identical to encoding wheel 40. However, it is not necessary that any of the encoding wheels be identical to any other encoding wheel. When the terms "inner ring" or "inner rings" are used, reference is made to the inner rings 37, 47, 57, 67, 87, 97, 107, and 117 of each of the encoding wheels 30 through 110. Only the inner rings of timing wheel 20 and encoding wheels 30 and 40 are actually numbered in FIG. 1. When the terms "outer ring" or "outer rings" are used, reference is made to the outer rings 39, 49, 59, 69, 79, 89, 99, 109, and 119 of each of the encoding wheels 30 through 110. Only the outer rings of encoding wheels 30 and 40 are actually numbered in FIG. 1. When the terms "coding section" or "coding sections" are used, reference is made to the coding sections 24, 34, 38, 44, 48, 54, 58, 64, 68, 74, 78, 84, 88, 94, 98, 104, 108, 114, and 118 of the timing wheel 20 and each of the encoding wheels 30 through 110. Only the coding sections of timing wheel 20 and encoding wheels 30 and 40 are actually numbered in FIG. 1. Additionally, timing marks 28 may be viewed as "coding sections." The data generated by timing marks 28 may be used for both position and/or speed determination. Likewise, the data generated by the other coding sections may be used for both position and/or speed determination.

Gear 11 of input wheel 10 meshes with pinion 25 of timing wheel 20. Gear 21 of timing wheel 20 meshes with gear 31 of encoding wheel 30. Pinion 35 of encoding wheel 30 meshes with gear 41 of encoding wheel 40. Pinion 45 of encoding wheel 40 meshes with an intermediate pinion 180. Intermediate pinion 180 meshes with gear 51 of encoding wheel 50. Pinion 55 of encoding wheel 50 meshes with gear 61 of encoding wheel 60. Pinion 65 of encoding wheel 60 meshes with an intermediate pinion 180. Intermediate pinion 180 meshes with gear 71 of encoding wheel 70. Pinion 75 of encoding wheel 70 meshes with gear 81 of encoding wheel 80. Pinion 85 of encoding wheel 80 meshes with an intermediate pinion 180. Intermediate pinion 180 meshes with gear 91 of encoding wheel 90. Pinion 95 of encoding wheel 90 meshes with gear 101 of encoding wheel 100. Pinion 105 of encoding wheel 100 meshes with an intermediate pinion 180. Intermediate pinion 180 meshes with gear 111 of encoding wheel 110.

As can be seen in FIG. 3, the gears of input wheel 10 and encoding wheels 40, 60, 80, and 100 are in the same plane as the pinions of timing wheel 20 and encoding wheels 30, 50, 70, 90, and 110. The pinions of encoding wheels 40, 60, 80, and 100 are in the same plane as the gears of timing wheel 20 and encoding wheels 30, 50, 70, 90, and 110.

Light splashguards (not illustrated) may protrude from bottom mounting rack 130 and top mounting rack 140. The splashguard is disposed in partial or complete concentric ring in between the inner and outer rings. For example, with encoding wheel 30, the splashguard is disposed between inner ring 37 and outer ring 39. The splashguard can be designed to have varying heights depending upon the distance between the bottom surface of the timing wheel 20 and encoding wheels 30 through 110, on the one hand, and the bottom mounting rack 130. The splashguard provides a light barrier between sensors 160. The splashguard may include concentric rings built into the bottom mounting rack 130, built into the encoding wheels 30 through 110 and timing wheel 20, or built into bottom board 120 and top board 170. Alternatively, barriers could be formed around the sensors 160 individually, or around the detectors 162 and the emitters 164. The splashguards may be concentric rings of ridges, walls, or any other structure capable of preventing crosstalk between different sensors 160.

Figure 5:
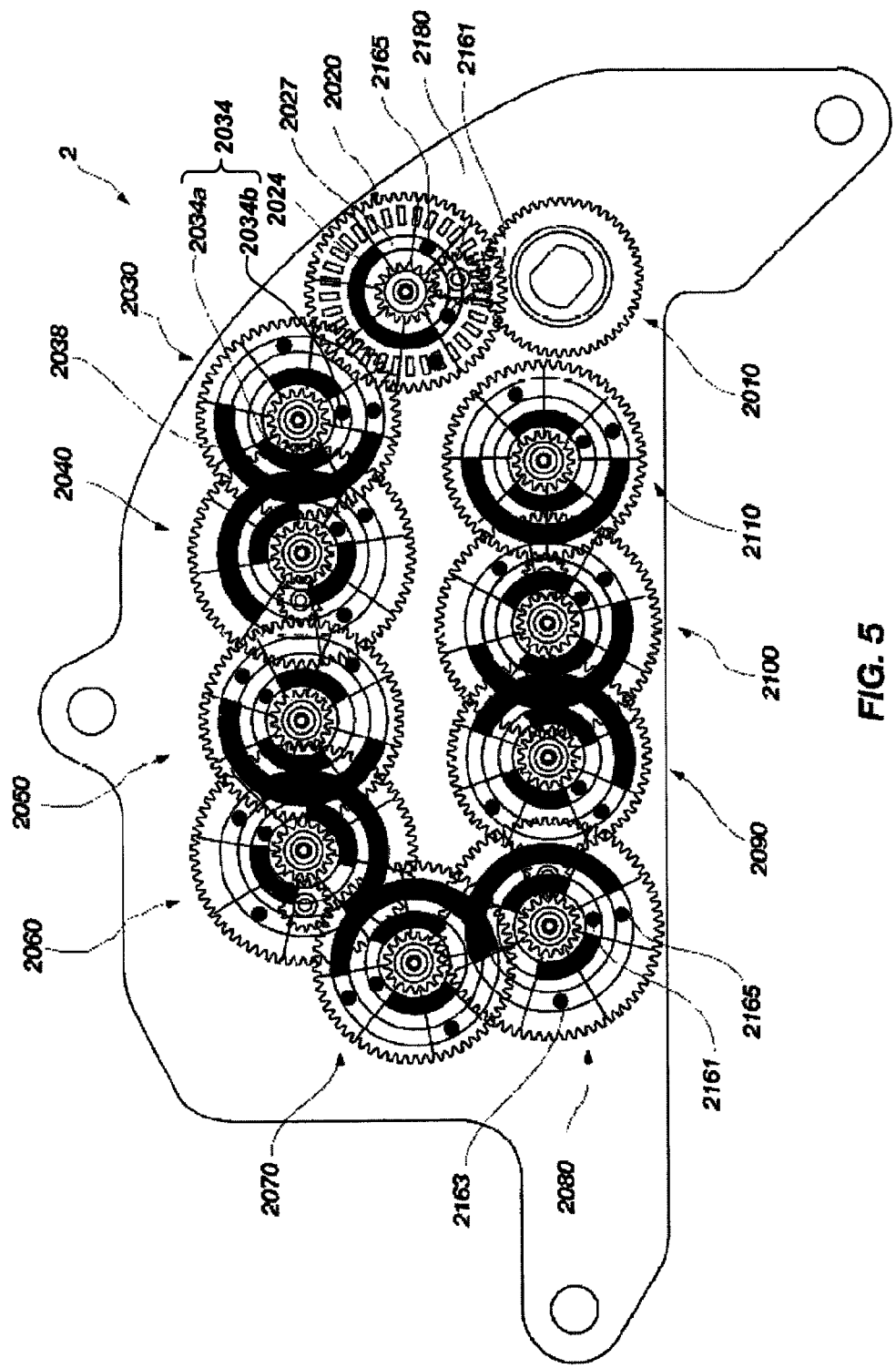
FIG. 5 illustrates the wheels of a particular embodiment of a rotary encoder.

The meshing of input wheel 10, timing wheel 20, and encoding wheels 30 through 110 is illustrated in the FIGS. 1-4 as being in a serpentine configuration. However, that configuration may be varied to meet different encoder designs. For example, when it is desirable to shape rotary encoder 1 as a circle, then the wheels may be arranged in a spiral configuration. Various shapes of rotary encoder 1 and numerous configurations of the wheels are possible. FIG. 5 illustrates an alternatively U-shaped configuration of the wheels within a similar rotary encoder shape.

Rotary encoder 1 may also be designed in a tiered structure. Input wheel 10, timing wheel 20, and encoding wheels 30 through 110 are shown in FIGS. 1-4 as being disposed in a single level. Alternatively, rotary encoder 1 may be designed to include wheels on multiple levels. In FIG. 1, each wheel is uniquely secured to the bottom mounting rack 130. However, multiple wheels could be mounted onto a single axle. In one embodiment, encoding wheels 60 and 70, encoding wheels 50 and 80, encoding wheels 40 and 90, and encoding wheels 30 and 100, respectively, could be disposed on the same axle. Timing wheel 20 and encoding wheel 110 could be disposed on the same axle. For an even narrower rotary encoder, wheels 40, 50, 80, and 90 could be disposed on the same axle and encoding wheels 30, 60, 70, 100, and 110 could be disposed on the same axle. It is understood that a number of configurations and combinations are possible.

Input wheel 10, timing wheel 20, and encoding wheels 30 through 110 are shown as spur gears. However, the wheels may also be wormgears, bevel gears, herringbone, hypoid, annular, rack and pinion, and helical gears. Rotary encoder 1 illustrates an embodiment where the encoding wheels have a fixed rotation. Alternatively, a rack and pinion system could be implemented where timing wheel 20 and encoding wheels 30 through 110 do not have a fixed rotation.

Referring to the particular embodiment shown in FIGS. 1-4, the inner and outer rings of different encoding wheels are positioned at the same distance from the center of the wheels. For example, inner ring 37 and coding section 34 are the same distance from the center of wheel 30 as inner ring 47 and coding section 44 are from the center of wheel 40, even though wheel 40 has a larger diameter. Therefore, the number of teeth 42 and teeth 36 can determine the speed reduction of wheel 40 from wheel 30. The same applies for the other wheels. However, it is not necessary that the coding sections of the different encoding wheels be equally radially located.

The speed of input wheel 10 is determined by the speed of the rotary device to be monitored. For example, in the present embodiment, timing wheel 20 turns approximately 1.34 times faster than input wheel 10. Encoding wheel 30 turns at the same speed as timing wheel 20. Encoding wheel 40 turns at a quarter the speed of encoding wheel 30. Encoding wheel 50 turns at a quarter of the speed of encoding wheel 40, which turns at a sixteenth of the speed of encoding wheel 30. The same can apply to the other encoding wheels such that encoding wheel 110 turns at a quarter of the speed of encoding wheel 100, which turns at $1/65,536^{th}$ of the speed of encoding wheel 30. In some scenarios, encoding wheel 30 will rotate, but not enough to cause rotation of encoding wheel 110. In alternative embodiments, additional encoding wheels can be added to rotary encoder 1. The speed of the additional encoding wheels may be calculated as $1/4n$ of encoding wheel 30 (counting encoding wheel 30 as n=0, encoding wheel 40 as n=1, ... encoding wheel 110 as n=8, etc.). Particular embodiments of the invention may include one encoding wheel with a small number of bits for the highest speed wheel, but allow increasing higher numbers of bits per wheel as the relative encoding wheel speed decreases as the wheel train grows.

There may be situations where it is desirable to vary the number of teeth from wheel to wheel. For example, where encoding wheels 40 and 60 do not have the same number of teeth. Additionally, in conjunction with varying the number of teeth on a gear, the radial position of a coding section can be varied relative to another wheel to create a speed reduction or increase.

The wheels may be made of any number of materials. A few representative examples are steels, stainless steels, aluminum, other metals, ceramics, plastics, glass, and plastics capped with metal. Any material known in the art for gears may be used. All of the wheels may be made of the same composition, or compositions may vary between the wheels.

As shown with reference to encoding wheel 80, sensor 160 includes detectors 162 and emitters 164. Detectors 162 and emitters 164 are built into bottom board 120. Gaps 134 are built into bottom mounting rack 130 to prevent obscuring detectors 162 and emitters 164. With regard to emitters 164 and detectors 162, these can be fabricated within the bottom board 120 via semiconductor manufacturing techniques, mounting the emitters 164 and detectors 162 on the bottom board 120, and inserting the emitters 164 and detectors 162 through holes in bottom board 120. It is understood that any other approach for securing emitters 164 and detectors 162 to bottom board 120 is also encompassed by the present invention. Gaps 144 (FIG. 4) are built into top mounting rack 140 and have the same function as gaps 134. Although not shown, rotary encoder 1 also can include sensors, including emitters and detectors, which are built into the bottom surface of top board 170. For each detector 162 built into bottom board 120, an emitter can be disposed directly overhead. For each emitter 164 built into bottom board 120, a detector can be placed directly overhead. Gaps 144 in top mounting rack 140, shown in FIG. 4, prevent any blocking of emitters and detectors by the top mounting rack 140. The sensors, detectors, and emitters located on the bottom surface of top board 170 are typically identical to sensors 160, emitters 164, and detectors 162 that are located directly overhead. As such, for ease of discussion herein, any corresponding components located on top board 170 that are substantially similar from components located on bottom board 120, although not shown in the figures, will be given the same reference number followed by a prime (') mark (e.g., detector 160 and detector 160').

The illustrated embodiment includes sensors 160, 161, 163, and 165. Sensors 161 correspond to the inner rings of timing wheel 20 and encoding wheels 30 through 110. Sensors 163 and 165 correspond to the outer rings of the encoding wheels 30 through 110. Sensors 160', 161', 163' and 165' are placed directly above sensors 160, 161, 163 and 165, respectively. Sensors 163 and 165 may be placed approximately 90 radial degrees apart. In encoding wheels 30, 60, 70, 100, and 110, sensor 161 may bisect the angle between sensors 163 and 165. In encoding wheels 40, 50, 80, and 90, sensors 161 and 163 may be approximately 45 radial degrees apart, and sensors 161 and 165 may be approximately 135 radial degrees apart. Sensors 161, 163, 165, and 169 are only numbered with respect to encoding wheels 80 and 100 and timing wheel 20. Each sensor 161, 163, and 165 includes an emitter 164 and detector 162. Each sensor 161', 163', and 165' includes an emitter 164' and detector 162'.

Sensors 160/160', including emitters 164/164' and detectors 162/162', may be described as a set of sensor pairs or as a double set of sensors. The same applies to the specific forms of sensors 160/160' and 160'/160" (i.e., sensors 161, 161', 163, 163', 165, 165', 169, and 169'). Instead of viewing emitter 164 and detector 162 as one pair, and emitter 164' and detector 162' as an opposing second pair, the emitter 164 and detector 162' may be viewed as one pair, and emitter 164' and the detector 162 may be viewed as a parallel second pair. The second pair, however viewed, can provide duplicate sensing. This redundancy enables rotary encoder 1 to be highly fault tolerant. For example, if one such pair should fail, rotary encoder 1 would still be operational. The encoder may also operate with a variety of sensors activated, depending upon which, if any, sensor or sensor components may have failed.

In a particular embodiment, the location of an emitter 164 and detector 162 of a sensor 160 is that location that gives the sensor 160 (and corresponding sensor 160') the widest and most symmetric possible placement tolerance. The locations at which the code value changes for a sensor leaves as much room in the clockwise (CW) as in the counter-clock wise (CCW) direction before the bit value will change again. This approach is illustrated in FIG. 1. In a particular embodiment, this results in asymmetrical sensor placements with corresponding asymmetry in code change points.

In an alternative embodiment, an emitter 164 may be offset with respect to a detector 162. The resulting first and offset decoded values could then be compared to ensure that the arithmetic difference between the two values is the same. If the arithmetic difference is not identical, then the problem could be located by the self-test discussed below.

In either embodiment, as long as the placement is within the bounds of the v-bit anti-backlash logic and within the bounds of the allowable mechanical tolerances of the components, the resulting codes will be identical.

In an alternative embodiment, sensors 161, 163, and 165 could each have a single emitter and the corresponding sensors 161', 163', and 165' could each have a corresponding single detector without any redundancy.

The various sensors are associated with timing marks 28. Sensor 169, shown in FIG. 1, includes at least one emitter 164 and at least one detector 162. Sensor 169' located on top board 170 is placed directly above sensor 169 and includes at least one emitter 164' and at least one detector 162'.

In a particular embodiment, the corresponding sensors located on the bottom board 120 and top board 170, respectively can be activated one wheel at a time. Alternatively, all or some of the wheels can be activated at one time. The bottom of each wheel is typically activated first, followed by the top side of each wheel. In a particular embodiment, individual emitters of sensors 160/160' may be activated. The various sensors 169/169' for monitoring timing marks 28 are activated continuously, as discussed in more detail below. With regard to encoding wheels 30 through 110, the emitters 164 of sensors 161, 163, and 165 can be activated. If rotary encoder 1 is in the position shown in FIG. 1, then detectors 162' of the sensors 161', 163', and 165' each receive a signal from the corresponding emitters 164. However, rotary encoder 1 could be positioned such that only detectors 162' of sensors 161' and 163', 161' and 165', 163' and 165', 161', 163', and 165', or none of these sensors, receive a signal. No matter the position of rotary encoder 1, detectors 162 will receive a signal when emitters 164 are activated. In a particular embodiment, emitters 164 and detectors 162 are capable of direct communication both vertically and side-to-side. Therefore, when three emitters 164 are activated, three detectors 162 shall receive a signal and three detectors 162' may receive a signal if an opening in the encoder wheel (i.e., and encoding section) is located between an emitter 164 and a detector 162'. Therefore, 6-bits of data are generated.

In the same fashion, when the emitters 164' of sensors 161', 163', and 165' located on top board 170 are activated, 6-bits of data are generated. Detectors 162' of the same sensors are activated, as well as, detectors of 162 of sensors 161, 163, and 165 on the bottom side of rotary encoder 1. Sensors 161, 163, and 165 of encoding wheel 30 may be activated. Then, sensors 161', 163', and 165' of encoding wheel 30 may be activated. This pattern of alternate sensor activation can continue relative to encoding wheels 40 through 110.

With regard to timing wheel 20, sensors 161 and 161' can be activated as described with respect to encoding wheels 30 through 110 above. In a particular embodiment, the emitters of sensors 169 and 169' are continuously activated. In the embodiment shown in FIG. 2, sensor 169' includes two emitters and sensor 169 includes two detectors, 162a, 162b. In a particular embodiment, all of the other sensors each have both an emitter and a detector. In a particular embodiment, only one emitter of sensor 169 is activated at a time.

First detector 162a and second detector 162b can be positioned so that when a timing mark 28 is present over first detector 162a, a timing mark 28 is not present over second detector 162b. This is illustrated in FIG. 1, where detector 162a and optional emitter 164 are visible, but detector 162b is not visible.

Alternatively, sensors 169 and 169' could each have both an emitter and detector, and the direct side-to-side transmission feature could be disabled. That feature could be disabled by using a different type of sensor or by placing a barrier around the edges of the detectors 162 and 162' and/or emitters 164 and 164'.

Sensors 169 and 169' may also include other emitters and detectors. For example, FIG. 2 illustrates an emitter 164 in sensor 169 that would correspond to a detector 162' in sensor 169'. Emitter 164 may be placed at a sufficient distance away from first detector 162a such that first detector 162a does not receive a light signal when emitter 164 is activated. In an alternative embodiment, emitters 164, first emitter 164a', and second emitter 164b' may be alternately activated.

Sensors 160 and 160' provide three levels of redundancy. First, if any one of emitters 164' and 164, and detectors 162' and 162 should fail, sensors 160 and 160' will still be operational. For example, should emitter 164 of sensor 161 of encoding wheel 80 fail, then sensor 161 will still be operational because emitter 164' of sensor 161' is still capable of communicating with detector 162 of sensor 161.

The second level of redundancy comes from a built-in-self-test (BIST) function. Placing a detector 162 adjacent to an emitter 164 provides a self-test. Even if there is not a clear light path because of the position of an encoding wheel, detector 162 will receive a signal when emitter 164 is activated. If detector 162 has not received a signal, then either or both emitter 164 and detector 162 (or the accompanying circuitry and processing) are malfunctioning. Once an encoding wheel has moved to a position where there is a clear light path, then if detector 192 is not receiving a signal, it is likely emitter 164 is malfunctioning. The viability of detector 162' and emitter 164 can be determined by activating emitter 164'. Similar logic applies if detector 162, detector 162', or emitter 164' starts malfunctioning, instead of emitter 164.

Processor 150 will take into account any failed components, such as an emitter 164 or a detector 162', when determining what position is identified by sensors 160 and 160'. For example, if detector 162 of sensor 163 adjacent to encoding wheel 80 should fail, then processor 150 can compensate for the fact that sensors 163 and 163' will not sense a blocked light path at the same point in the rotation of encoding wheel 80. Alternatively, using the same example, if the detector 162 is not receiving a signal, detector 162 can be tested by adjacent emitter 164 to determine if the detector 162 is operational. Emitter 164' may be tested by adjacent detector 162' to determine whether emitter 164' is the source of the problem. If emitter 164' and detector 162 are operational and emitter 164' is transmitting, but detector 162 is not receiving the transmission, then outer ring 89 is blocking the light path between emitter 164' and detector 162. Also, if detector 162 has failed, then processor 150 may evaluate the positions of encoding wheels 30 through 70, and 90 through 110, to determine whether outer ring 89 is in fact blocking the malfunctioning detector 162.

A third redundancy may be provided by any of the sensors 160 and 160' by utilizing Viterbi decoding. For example, either the output of sensor 163 or sensor 165 may be utilized to generate a Viterbi bit (v-bit). If a sensor 160 or sensor 160' is not operated upon to produce a v-bit, then the sensor 160 or 160' is utilized to produce a data-bit. In a particular embodiment, sensors 165 and 165' are utilized to generate the v-bit. The Viterbi decoding algorithm is a forward error correction technique. The v-bit provides redundant data that may be used to precisely decode the positions of the other 2-bits. In this embodiment, sensors 161 and 161' can provide 1-bit of data and sensors 163 and 163' can provide the second-bit of data. By using a v-bit, the angular offset of signals generated by sensors 161 and 161' and sensors 163 and 163' can be as much as +/−22.5 degrees from the optimal position without causing a coding error. Therefore, even if a signal is received with an offset, the true position of the wheel will still be indicated. The v-bit on one encoding wheel also clarifies the true position of an adjacent encoding wheel. For example, the v-bit of encoding wheel 30 helps clarify the true position of encoding wheel 40.

Viterbi decoding is not the only decoding algorithm that encoding wheels 30 through 110 may be designed to implement. Other suitable algorithms for use with the present invention include, for example, sequential decoding, Reed-Solomon coding, and turbo coding. Another alternative to Viterbi decoding is gear counting.

In rotary encoder 1, sensors 165 that generate the v-bits are offset from sensors 161 and 163. Alternatively, sensor 165 can be arranged in-line with a data-bit producing sensor 163 or 161. FIG. 5 illustrates an embodiment of an absolute encoder (rotary encoder 2) where the v-bit sensor 2165 is positioned in-line with a data-bit sensor 2161 and is offset from a data-bit sensor 2163. As seen with reference to timing wheel 2020, the v-bit sensor 2165 may also be positioned to sense coding section 2034 on the inner ring 2027. V-bit sensors 2165 may be positioned to sense the inner rings of any or all of encoding wheels 2030 through 2110. Therefore, sensors 161 or sensors 2161 could also be a v-bit.

Rotary encoder 2, shown in FIG. 5, operates similarly to rotary encoder 1, except for a few differences. Input wheel 2010 has a different number of teeth. Coding section 2024 divides inner ring 2027 in half rather than in quarters. Additionally, a sensor 2165 is included in the same concentric ring as sensor 2161. Timing wheel 2020 includes a pinion 2025, on either side of which is an intermediate pinion 2180.

Encoding wheel 2030 includes gear 2031, having teeth 2032, and pinion 2035, having teeth 2036. Encoding wheel 2030 has an inner ring 2037, which contains coding section 2034, and an outer ring 2039, which contains coding section 2038. Coding sections 2034 and 2038 extend from the top surface of encoding wheel 2030 to the bottom surface of wheel 2030. Coding section 2038 is shown as a continuous arcuate section that occupies one-half of outer ring 2039. Coding section 2034 includes two different arcuate sections, section 2034a and section 2034b, each of which are shown occupying one-quarter of the inner ring and being equally spaced from each other. The middle of section 2034a is in-line with the middle of coding section 2038. Section 2034b occupies the space directly opposite section 2034a.

Encoding wheel 2040 includes gear 2041, having teeth 2042, and pinion 2045, having teeth 2046. Pinion 2045 is mounted on the underside of encoding wheel 2040. In the embodiment of FIG. 5, pinion 2045 is visible through encoding wheel 2040. Encoding wheel 2040 has coding sections 2044 and 2088, similar to encoding wheel 2030. For purposes of description, only the coding sections of timing wheel 2020 and encoding wheel 2030 are labeled in FIG. 5.

Encoding wheels 2050, 2070, 2090, and 2110 can be identical to encoding wheel 2030. Encoding wheels 2060, 2080, and 2100 can be identical to encoding wheel 2060. The terms "inner ring," "inner rings," "outer ring," "outer rings," "coding section," and "coding sections" are used to describe rotary encoder 2 in the same fashion as used with reference to rotary encoder 1.

Input wheel 2010 meshes with intermediate pinion 2180, which in turn meshes with pinion 2025 of timing wheel 2020. Pinion 2025 meshes with intermediate pinion 2180, which in turn meshes with gear 2031 of encoding wheel 2030. Pinion 2035 of encoding wheel 30 meshes with gear 2041 of encoding wheel 2040, and so on through encoding wheel 2110. Encoding wheels 2030 through 2110 mesh in a similar manner as encoding wheels 30 through 110.

In the present embodiment, the teeth of input wheel 2010 and the gears of encoding wheels 2030, 2050, 2070, 2090, and 2110 can be configured to lie in the same plane as the pinions of timing wheel 2020 and encoding wheels 2040, 2060, 2080, and 2100. The pinions of encoding wheels 2030, 2050, 2070, 2090, and 2110 can be disposed in the same plane as the gears of encoding wheels 2040, 2060, 2080, and 2100.

Referring to rotary encoder 1, sensors 160 and 160' provide an indication of the absolute position of the input shaft that turns input wheel 10. As illustrated, rotary encoder 1 is an 18-bit absolute encoder. Therefore, rotary encoder 1 is capable of indicating 262,144 positions. Of course, not all of the positions need to be used. Rotary encoder 1 can be scaled up or down by adding or deleting wheels and sensors to or from the end of the train. Three sensors 160 and 160' may be supplied per wheel. Alternatively, only one or two sensors sets 160 and 160' may be provided per wheel or at the last wheel in the chain, so long as the sensors are positioned to act as the next higher order bits in the coded value. Rotary encoder 1 may also only have a single encoding wheel that serves both as the source for speed and position data. Rotary encoder 1 may also only have a single position encoding wheel and a separate speed sensing mechanism, such as a timing wheel. Additionally, each of the encoding wheels may have any number of coding sections and corresponding sensors 160 and 160'. Rotary encoder 1 may be any encoder design that utilizes sensors 160 and 160'.

As discussed above, sensors 160 and 160' are able to communicate when a coding section is disposed between the sensors, thereby providing a clear light path. In sensors 160, detectors 162 output a logic 0 value when a signal is received and output a logic 1 value when a signal is not received. Similarly, in sensors 160', detectors 162' output a logic 0 value when a signal is received and output a logic 1 value when a signal is not received. Therefore, when a coding section is located between sensor 160 and sensor 160', when the emitter 164 is activated, processor 150 receives two individual logic inputs: One input from detector 162', which senses position, and one input from detector 162, which conducts a self-test. Once emitter 164 is deactivated and emitter 164' is activated, then processor 150 receives 2 individual logic inputs: one logic input from detector 162 sensing position and a logic input from detector 162' conducting a self-test.

If an inner or outer ring blocks communication between sensors 160 and 160', then processor 150 will receive a logic 0 input representing an bit value in the position code and a logic 1 input, representing a success test of an emitter associated with this bit position. For example, when emitter 164 is activated, detector 162' will be blocked from receiving a signal and will transmit logic 1. Detector 162 will still receive a signal by direct side-to-side transmission and, therefore, transmit logic 0 to processor 150.

When processor 150 receives logic 0 signals from a detector 162' and an opposing emitter 164 is activated, then processor 150 recognizes that a coding section must be present. The same result is achieved when an emitter 164' is activated and a detector 162 sends logic 0 signals. The present embodiment uses 0 and logic 0 signals; however, 0 and 5 volts, 1 and 5 volts, or any other common sensor signals or combinations thereof may be used. Additionally, detectors 162 and 162' may be designed such that logic 0 is generated whenever a light signal is not received and 0 volts are generated whenever a light signal is received. In such an embodiment, processor 150 would receive an indication of a coding section between sensors 160 and 160' when 0 volts are received from detector 162' and emitter 164 is activated.

In a particular embodiment, the self-test of an adjacent detector 162 by an emitter 164 is conducted by direct transmission from the side of emitter 164 to detector 162. For example, detector 162 can be located 0.5 mm from emitter 164. Alternatively, sensors incapable of direct side-to-side transmission may be used. In such an embodiment, a self-test can be conducted via reflectance. For example, when a coding section is present between sensors 160 and 160', and emitter 164 is activated, only detector 162' would receive a signal. When emitter 164' is activated, only detector 162 would receive the signal. This would allow both emitters 164 and 164' to be activated at the same time. When a coding section is not present, such that light would be blocked between sensors 160 and 160', detectors 162 and 162' can be adapted to receive reflected light signals. In that scenario, when emitter 164 is activated, light can be reflected off the bottom surface of an inner or outer ring. Detector 162 can receive a portion of the reflected light. Detector 162 can be designed to transmit logic 0 if any light is received. Detector 162 can be designed to transmit a voltage comparable to the intensity of the light received. Therefore, when a coding section is present, then detector 162 can receive a relatively high intensity direct light signal from emitter 164' located directly above detector 162. When a coding section is not present, then detector 162 can receive a relatively low intensity reflected light signal from adjacent emitter 164.

In another embodiment, coding sections may be painted on the wheels, rather than relying on cut-out sections of the wheels. In such an embodiment, no communication occurs between sensors 160 and 160'. Instead, detector 162 receives reflected light from emitter 164. The same applies to detector 162' and emitter 164'. For example, if the wheels are non-reflective (e.g., painted black) and the coding sections are reflective (e.g., painted white), or vice versa, then detector 162' will produce one voltage when light reflects off of the coding sections and a different voltage when light reflects off of a non-coding section. Additionally, sensors 160 and 160' may be located on the same side of an encoding wheel.

Sensors 160 and 160' have been described with respect to optical sensors. However, it is understood that numerous other sensors may be used with the invention. Without limitation, other suitable examples of sensors include magnetic sensors, Hall effect sensors, and electrical contacts. Any type of sensing known in the art for incremental and absolute encoders may be used with the present invention. Coding sections may also include any material or configuration that is compatible with the selected sensor.

Processor 150 may also be designed to generate alarms. If a detector 162, emitter 164, detector 162', emitter 164', detector 162a, detector 162b, emitter 164a', or emitter 164b' should fail, processor 150 can provide set off an alarm. Varying alarms can be provided for different levels of failure priority. In extreme situations, processor 150 can be designed to force the shutdown of the valve actuator or other rotary equipment monitored by rotary encoder 1. Alarms may be expressed in numerous ways, such as, for example, visual alarms (such as a flashing light or an LCD message on the control panel of a valve actuator or at a control station) audible alarms, or written warnings.

In sensor 160 and 160', if emitters 164 and 164' and detectors 162 and 162' are not functioning properly, then the data-bit or v-bit generated will be declared invalid. Invalid bit values may be judged for their impact on the performance of the valve actuator or other rotary equipment monitored by rotary encoder 1 based upon the decoded value of the failed bit and the stroke time. Invalid bit values may also be evaluated based upon the number of bits that have failed.

The stroke time for a valve actuator is the time it takes for a valve to go from an open position to a closed position, or vice-versa. The stroke time for other rotary equipment is the time it takes for the rotary equipment to go from a first position to a second position. For example, for an industrial reel, the stroke time is the time it takes for the reel to go from fully wound to fully unwound. When stroke time is large, a single bit only corresponds to a small percentage of the overall stroke time. Therefore, a single bit failure is not likely critical and providing an alarm or warning, short of forcing a machine shutdown, may be sufficient for such an application. If the stroke time is short, a single bit failure may indicate a large deviation between actual position and the position indicated by the rotary encoder 1. Therefore, for short stroke times, a single bit failure may be sufficient to force the shutdown of the rotary equipment in addition to providing an or warning. The importance of a bit failure can depend upon what portion of the stroke time may be represented by the bit failure for a given application. In a particular embodiment, the user may be able to configure the allowable threshold for loss of accuracy, below which the BIST feature would merely provide an alarm or warning, but beyond which the BIST feature would force a safe machine shutdown and also provide an alarm or warning.

For rotary equipment that does not have a predetermined first and second position, the stroke time may not be fixed. Examples of such rotary equipment include the flywheel of an engine or the main shaft of a turbine. A rotary encoder of the present invention may be used with any type of rotary equipment as well.

As mentioned previously, if both detectors 162 and 162' of sensors 160 and 160' are verified as operational by self-tests, but detector 162 is not receiving a signal whereas detector 162' is receiving a signal, then a check of the positions of the other wheels can be used to confirm the position of the wheel in question. In that scenario, the data-bits generated by sensors 160 and 160' are in fact valid, but half of sensors 160 and 160' are blocked by an inner or outer ring. The viterbi logic operations can yield the identical position code from either the primary or the redundant sensor set (i.e., emitter 164 or detector 162). It is understood that the terms "primary" and "secondary" or "redundant" are arbitrary.

Alternatively, sensors 160 and 160' may be fully functioning, but a different component of rotary encoder 1 has failed. For example, if one of the teeth on an encoding wheel shears away, the current position indicated by sensors 160 and 160' may not match the position anticipated based upon previous data provided by sensors 160 and 160'. Therefore, while sensors 160 and 160' are working properly, they are not indicating a correct position. Processor 150 or some other processor may provide correction for this error and generate an For example, if encoding wheel 60 should lose a tooth 62 from gear 61, encoding wheel 60 may begin to miss positions during each revolution. Therefore, the valve position indicated by all of the encoding wheels will no longer correspond precisely to valve position. It will appear as if the valve has jumped to another position. In one embodiment, processor 150 can search for discontinuities in the valve position indicated by the positions of the encoding wheels. Alternatively or additionally, timing wheel 20 may be utilized as an incremental encoder to verify the position of the encoding wheels. Processor 150 (or any other suitable processor) can then recalculate valve position, taking into account the error introduced by encoding wheel 60. Processor 150 could also generate an and/or instigate a safe-shutdown if the failure is of a serious magnitude.

Any failure of rotary encoder 1 that results in a discontinuous indication of valve position may be identified by processor 150, or by any other processor in communication with processor 150.

Sensors 160 and 160' have been described herein as containing both an emitter and a detector, respectively. Alternatively, sensor 160 can be configured to only have an emitter and sensor 160' can be configured to only have a detector. In other embodiments, sensor 160' may not be present in rotary encoder 1. FIG. 2 shows sensor 160 as having multiple emitters and detectors. Sensor 169 includes an emitter 164, a first detector 162*a*, and a second detector 162*b*. Although not shown, sensor 169' includes a corresponding detector 162', a first emitter 164*a'*, and a second emitter 164*b'*. Second detector 162*b* and second emitter 164*b'* may be used to verify the data from first detector 162*a* and first emitter 164*a'*, or to effectively double the data output generated by sensors 169 and 169'. Sensors 160 may include any number of emitters, detectors, and/or both. Sensors 160 and 160' may be utilized with any rotary encoder to provide fault tolerant speed and position data.

FIGS. 1-5 illustrate an absolute encoder where each of the encoding wheels has only an inner ring and an outer ring. However, each of the encoding wheels may have any number rings, without limitation. For example, each encoding wheel could have 3, 4, 5, or 6 rings. At least one sensor 160 and at least one sensor 160' could be provided for each ring. Therefore, the number of rings would determine the number of data-bits that could be generated per encoding wheel.

The number of rings per encoding wheel is governed by the size of the encoding wheel and the width of the coding sections needed to allow sensor 160 and 160' to communicate with each other. Additionally, a sufficient gap between rings should be provided to limit the crosstalk between sensors on the same side. For example, a gap is provided to keep a detector 162 of a sensor 161 from registering a signal from an emitter 164 of a sensor 163. However, other techniques other than gaps, such as use of the splashguard discussed above, may be used to limit crosstalk and allow for smaller encoding wheel diameters.

Any number of encoding wheels may be added to the encoders of the present invention. For example, rotary encoder 1 can provide position data for a common speed valve actuator with a stroke time of an hour. Adding more encoding wheels would provide more data-bits and increase the stroke time that may be handled by rotary encoder 1. Of course, rotary encoder 1 may also be used with valve actuators and other rotary equipment that has a stroke time of less than an hour. Rotary encoder 1 may also have less encoding wheels than those shown in FIGS. 1-4.

Additionally, the rotary encoder 1 may be a single wheel absolute encoder or single wheel incremental encoder. INI In those embodiments, sensors 160 and 160' may include multiple emitters and detectors, thereby providing built-in-self-test and fault tolerant operation. Therefore, a set of sensors 160 and 160' may be monitoring multiple coding sections, such as timing marks 28 or coding section 34, or a set of sensors 160 and 160' may be monitoring a single coding section, such as coding section 38.

Additionally, timing wheel 20 may be used as an incremental encoder in conjunction with the absolute encoding functions of the remainder of rotary encoder 1. For example, a particular incremental encoder embodiment may be scaled such that the incremental pulse rate exactly matches the count rate of the absolute portion of the encoder. This way, the incremental encoder could be used to obtain position data while the actuator is operating. When the motor stops, the final incremental count, added to the absolute position code at the start of motoring, should exactly match the new absolute coded position.

If the position indicated by timing wheel 20 (also functioning as an incremental encoder) differs from the position indicated by the encoding wheels, then a self-test of sensors 160 and 160' may be performed. If a self-test confirms that all sensors 160 and 160' are functioning properly, then it is likely that an encoding wheel is not tracking properly. Therefore, alarms or warnings may be generated. In a particular embodiment, in that scenario, a rotary encoder may rely on the incremental encoder until the rotary encoder is repaired.

Rotary encoders 1 and 2 are designed to use gray coding; however, binary coding may be used as well. The use of v-bits and duplicate sensors provides that rotary encoders 1 and 2 will never differ by more than one Least Significant Bit [LSB], thereby increasing the user's confidence in the reliability of the encoder values.

The present invention may be used with any number of rotary devices that rotate between two positions, such as, for example, a valve actuator, door opener, or a reel. In a typical valve actuator, an electric motor may drive the valve via a set of gears. The output shaft of the motor may be directly coupled to a worm. The worm may drive a worm-gear assembly that, in turn, drives a drive sleeve or shaft, which in turn raises and lowers or turns a valve stem. A second shaft may also be driven by the worm-gear assembly in order to drive input wheel 10 of rotary encoder 1. Alternatively, the valve actuator may use a different gear set or the electric motor output shaft may be directly coupled to the valve stem without an intermediate gear set. There are numerous ways known in the art of connecting rotary position encoders to rotating devices that can be used with the present invention but which will not be discussed herein. In a preferred embodiment, rotary encoders 1 and 2 may be used to perform diagnostics on rotary equipment, such as valve actuators. With respect to the diagnostic function, rotary encoder 1 will be used as an illustrative example. However, other encoders of the present invention, such as rotary encoder 2, could also be used. Additionally, a timing wheel 20 could be incorporated into any rotary encoder. Timing wheel 20 could be the encoding wheel of an incremental encoder or of a single-wheel absolute encoder. For example, timing marks 28 may also be used for position encoding of an absolute encoder. Alternatively, as illustrated in FIG. 1, timing wheel 20 may also include encoding sections separate from timing marks 28. In another embodiment, timing marks 28 may be a part of a larger encoding pattern, such as, for example, the encoding pattern of a single wheel absolute encoder. In a particular embodiment, timing wheel 20 may be an incremental encoder separate from or in conjunction with other encoding wheels. In that embodiment, timing marks 28 not only are used to generate speed data but also generate incremental position data. Timing marks 28, like the coding sections, may take any form or structure necessary to work with sensors 160 and 160'. Timing marks 28 may be holes, lines, embedded magnets, engravings, or any other structure known in the art for use with an absolute or incremental encoder.

Timing wheels 20 and 2020 are illustrated with thirty-two timing marks 28 and timing marks 2028 respectively. However, timing wheels 20 and 2020 may have any number of timing marks 28.

With respect to frequency analysis, a particular embodiment of performing frequency analysis (also referred to herein as frequency domain analysis) on speed data is initially discussed below, followed by discussion of non-speed data embodiments. Additionally, for purposes of illustration, the timing wheel 20 or timing marks 28 of timing wheel 20 are often referred to herein as the source of the speed data. In other embodiments, any type of speed sensor, with or without a rotary position encoder may be used for diagnostics (i.e., frequency analysis). Additionally, the discussion regarding frequency analysis of speed data is equally applicable to other data embodiments. Other data embodiments can include, for example, torque data, position data, thrust data, acoustic noise data, current data, voltage data, motor power data, motor volt-ampere reactives data, and vibration data. Numerous types of data and types of sensors may be utilized in frequency analysis, as are known in the art. The invention covers any type of data that may be generated via sensors and a valve actuator or other rotary equipment.

Although the following discussion involves rotary encoder 1, it is understood that the same discussion applies to rotary encoder 2. Timing marks 28 on timing wheel 20 may be used to generate speed data. Sensors 169 and 169' can record the length of time each one of the timing marks 28 is presented before the sensors. This dwell time can then be used to precisely determine the speed of rotary devices, such as valve actuators. The speed data may be used to determine the speed of an input shaft driving input wheel 10. Often the input shaft will, in turn, be attached to other rotary equipment, such as the wormgear of a valve actuator. Therefore, timing marks 28 may be used to determine the speed of other rotary equipment, such as a wormgear.

In a particular embodiment, timing marks 28 are configured as equally spaced and equally sized holes in timing wheel 20. However, any of the previously discussed coding section embodiments and sensor embodiments apply as well to the embodiments of timing marks 28 and sensors 169 and 169' embodiments, respectively.

The speed data generated by timing marks 28 may be operated on with an FT to convert the speed data from a time domain to a frequency domain. However, any type of speed sensor may be used to generate the speed data for conversion to frequency data.

FT expects signal samples to occur at regularly spaced time intervals. However, because the dwell time values for the speed signals in this invention may not be constant, a means may be employed to allow the FT to yield useful information. By choosing a sufficiently large number of data points, the vast majority of which are taken while the machine is operating at steady state, the average dwell time of the large data set may be used as the 'regular' dwell time $[t_d]$ for each data sample. This 'regular' dwell time can be used to scale the frequency scale of the resulting FT. ($f_n$ (Hz)=$1/(t_d * \#$ samples). When the frequency data is properly scaled, the data provides an operator with sufficient information to determine variations in speed that could be associated with known rotating speeds of the various components of the drive-train, and could indicate existing or looming problems in the drive-train of a valve actuator or other rotary equipment. For example, a baseline frequency vs. amplitude chart or graph could be created and saved when the equipment is new. Later, new frequency vs. amplitude charts or graphs could be created and compared to the saved baseline chart or graph. If a peak corresponding to a operating frequency of a given component should appear at a frequency or amplitude different than that previously measured, then it becomes apparent that the component associated with that frequency is behaving differently than when new, which would usually indicate wear and possible failure or pending failure. Therefore, the appropriate maintenance can be performed at a convenient time prior to failure of the component. Additionally, FT analysis could be scheduled to run automatically in the processor 150, which would be programmed or configured such that a change in the amplitude of a peak beyond a configured threshold could be used to generate an automatic alarm or warning or force a safe shutdown of the machine. Any methods of properly scaling frequency data, as known in the art, can be used.

Figure 6:
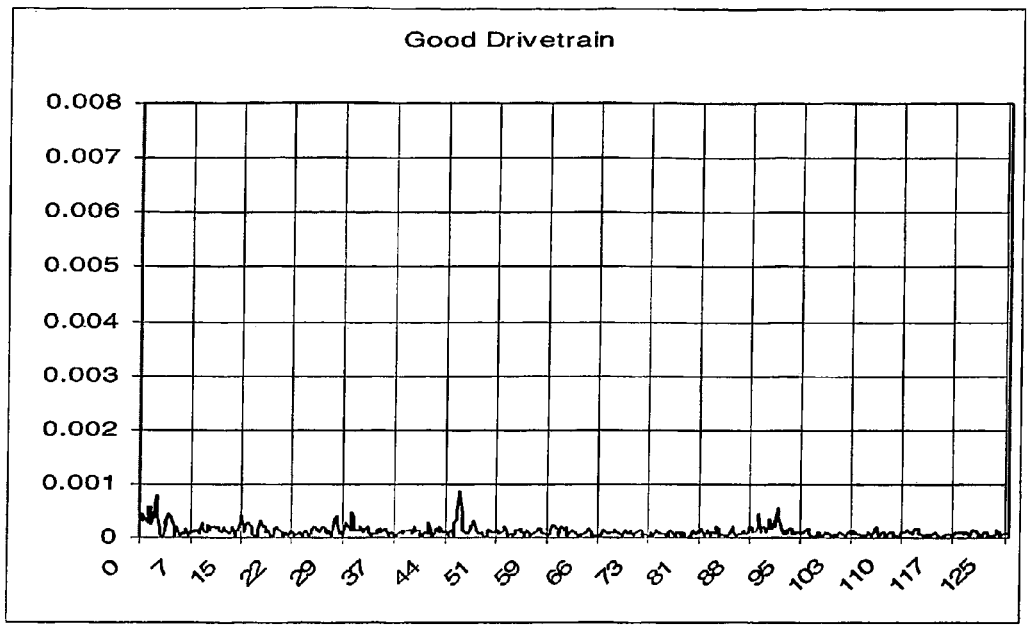
FIG. 6 illustrates a representative clean diagnosis in the frequency domain.
Figure 7:
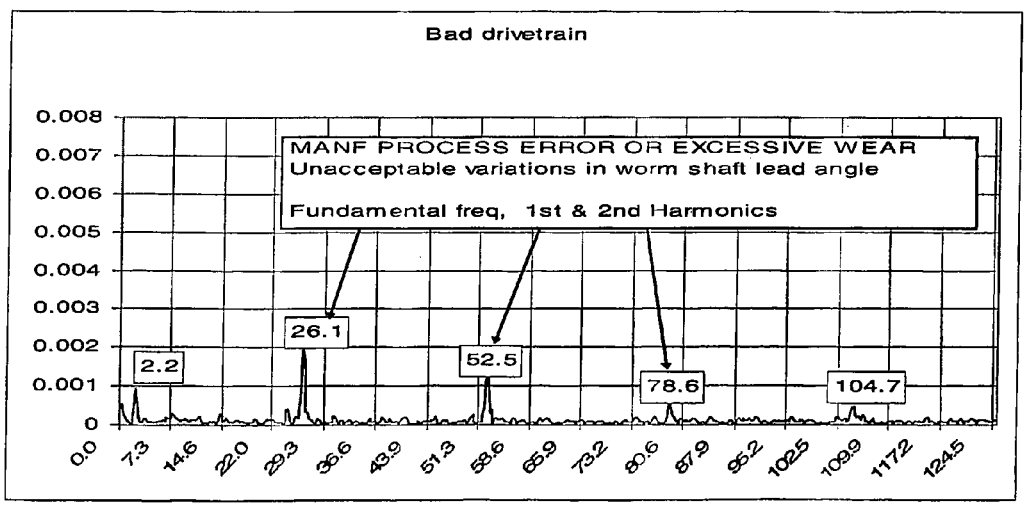
FIG. 7 illustrates a representative problematic diagnosis in the frequency domain.
Figure 8:
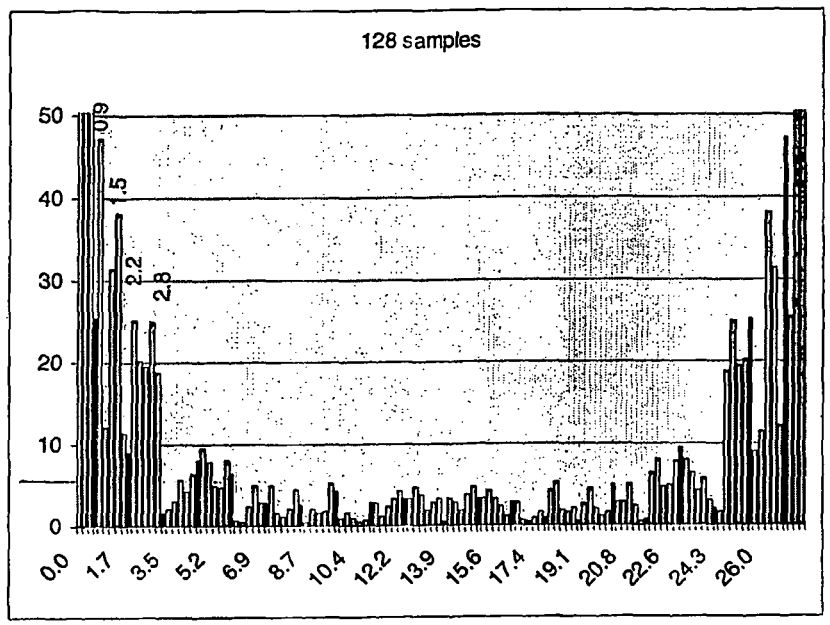
FIG. 8 illustrates data resolution with 128 samples.

Examples of frequency domain analysis are included in the FIGS. 6-8. FIG. 6 shows an example of a clean diagnosis in the frequency domain for a valve actuator or a "good" drive-train. FIG. 6 illustrates a peak at 45.9 Hz; however, the peak, measuring 0.1% relative to the operating speed of the actuator (magnitude 100% at 26 rpm, or 0.43 Hz) is not of a sufficient magnitude to warrant concern. FIG. 7 shows an example of a valve actuator generating several deviant signals in the frequency domain or a "bad" drive-train. The frequency of the deviant signal may be used to identify the drive-train component having a problem. In FIG. 7, a worm shaft or wormgear is out of tolerance. For example, the peak at 26.1 Hz indicates a problem. However, the peaks at 52.5 Hz and 78.6 Hz are harmonics of the 26.1 Hz peak.

Processor 150 or the processor that performs the FT may be designed to automatically generate the appropriate markers for peaks that are significant (e.g., above a certain threshold). For example, the processor may include a program designed to match currently generated peaks with the amplitude and frequency of previously generated peaks. In that embodiment, if the processor is unable to identify a peak, then such failure can serve as a warning to an operator of a potential problem. Alternatively, the data in the frequency domain may be manually correlated with parts of a drive-train of the valve actuator. An operator can be trained to identify and understand the relevance of different peaks. For example, if rotary encoder 1 is present in a valve actuator, then timing wheel 20 and sensors 169 and 169' may be used to identify the speed of a drive-train component. In a particular embodiment, the input shaft that drives input wheel 10 is, in turn, driven by a wormgear. Therefore, the speed sensor may be used to determine the speed, and hence the frequency, of the wormgear. Then, based upon gear ratios, the frequencies of the other drive-train components may be calculated. The component frequencies and any harmonics could then be identified on a graphical representation of the data in the frequency domain. On the other hand, if a speed sensor is not present in the valve actuator, but actual motor shaft speed is known, then that information may be used to generate component frequencies. Various types of electrical or magnetic measurements of the actual speed of the motor can be employed, thus further enhancing the diagnostic capability of the system as a whole. In most cases, factory personnel would perform the above manual identification. Therefore, end-users can be provided with pre-labeled sample frequency domain graphs and correlations.

In a particular embodiment, the build information for an actuator (gear ratios, motor speed, teeth per gear, balls per bearing, etc.) may be downloaded for storage in an electronics package of the actuator. An on-board CPU may then refer to the stored information and deduce which part of the drive is causing the variation. A plot of the FT can be displayed directly on an LCD screen of the actuator, or the data array can be downloaded to an operator's asset management system for analysis or to a service technician's laptop or PDA for transmission to the home office for detailed analysis.

Programming for collecting data and/or performing frequency analysis may be stored in firmware, software, hardware, or any other means known in the art. For example, frequency analysis programming may be stored in the firmware of a valve actuator.

Additionally, an operator may identify peaks in the frequency domain simply by comparing a current analysis with a previous analysis. The previous analysis may be an analysis conducted at the factory. However, there may be situations where it is desirable or necessary to identify peaks in the frequency domain independent of any previous analysis. For example, in the design stage of a new valve actuator, an engineer may want to perform frequency analysis on a new prototype to ensure that no life-shortening vibrations, resonances and/or harmonics are inherent in the design of the prototype. Alternatively, frequency analysis may be used as a post-assembly pre-shipment inspection tool to determine if some part of the mechanical drive-train has been fabricated with a physical defect.

A processor built into the rotary encoder, or built into or associated with the valve actuator or other rotary equipment, can perform the FT. A display, printer, or other output device may be incorporated into the valve actuator for displaying the results in a chart or graphical form. Alternatively, the speed data generated by timing marks 28 can be sent to a remote computer, such as an operator's PC, to perform FT upon the speed data and display it in more user friendly formats, or transmit the data or FT to technicians that may be located on or offsite.

Figure 9:
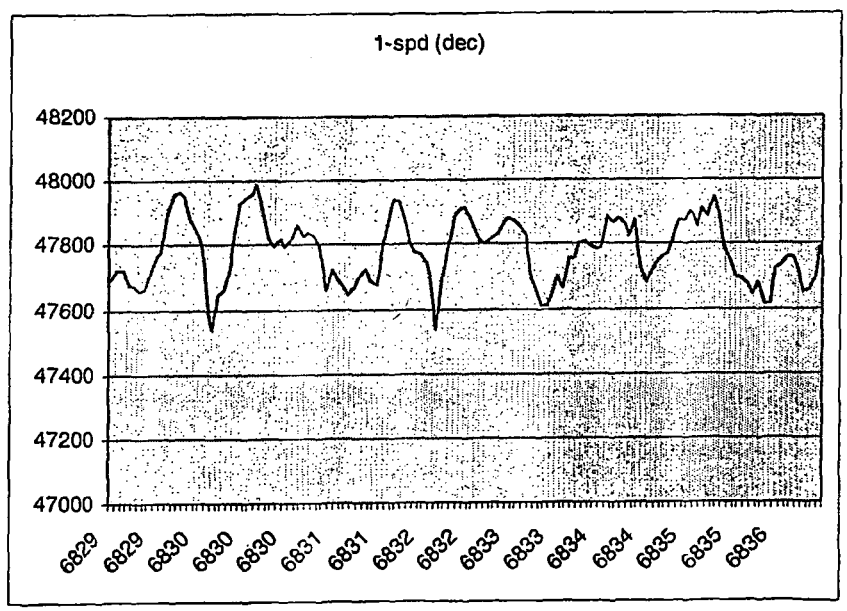
FIG. 9 illustrates the data used in FIG. 8 prior to performing a Fourier Transform (FT) on the data.
Figure 10:
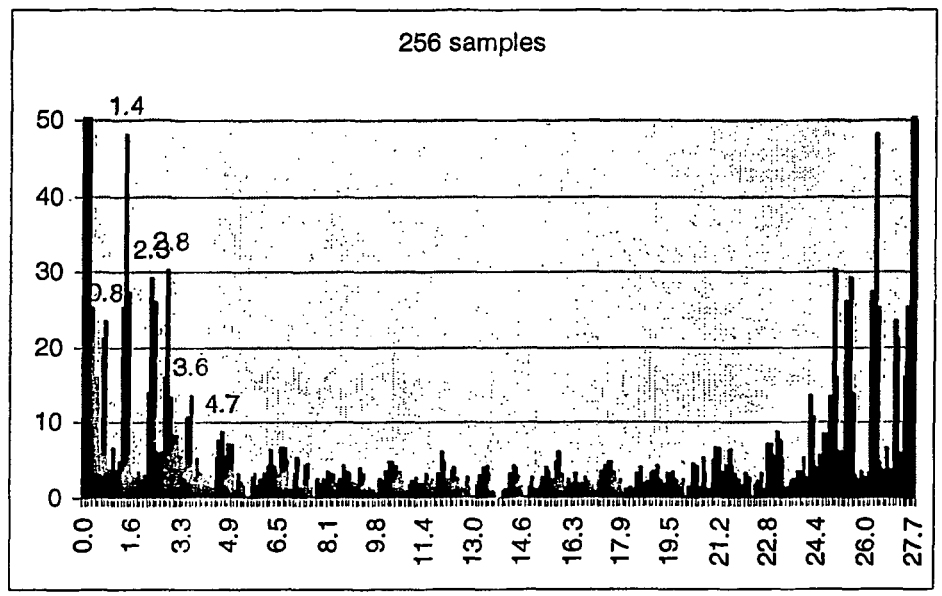
FIG. 10 illustrates data resolution with 256 samples.
Figure 11:
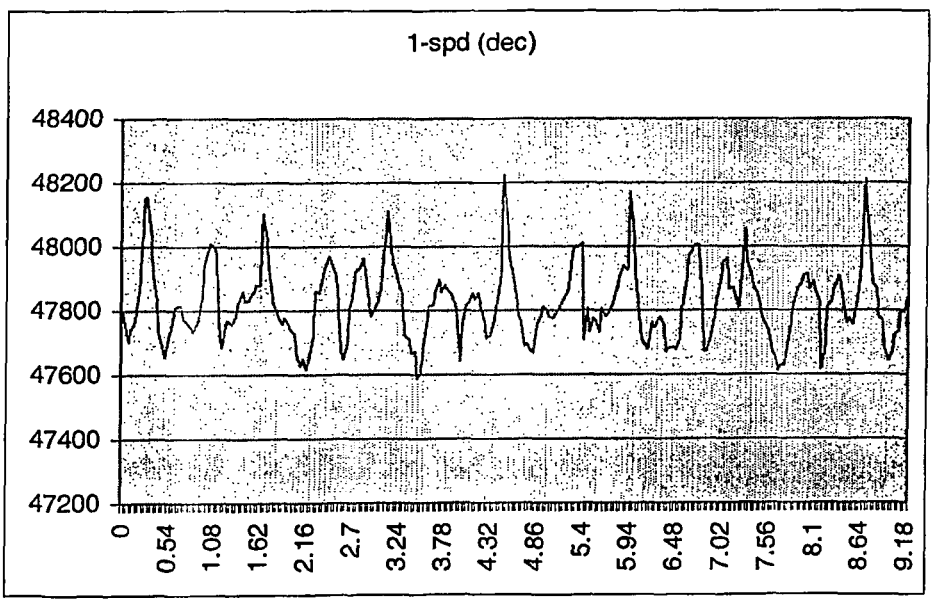
FIG. 11 illustrates the data used in FIG. 10 prior to performing a FT on the data.
Figure 12:
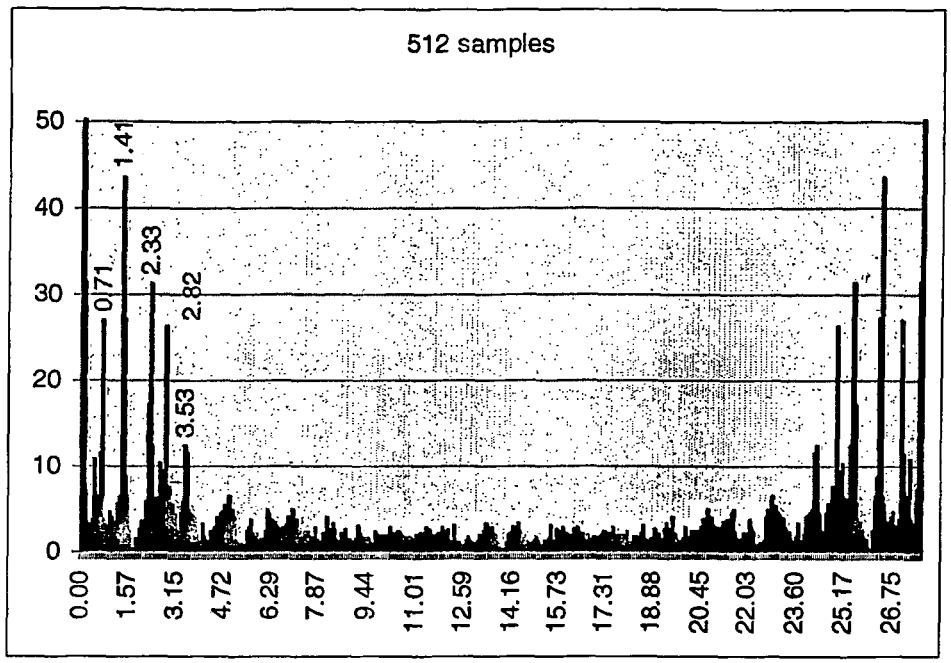
FIG. 12 illustrates data resolution with 512 samples.
Figure 13:
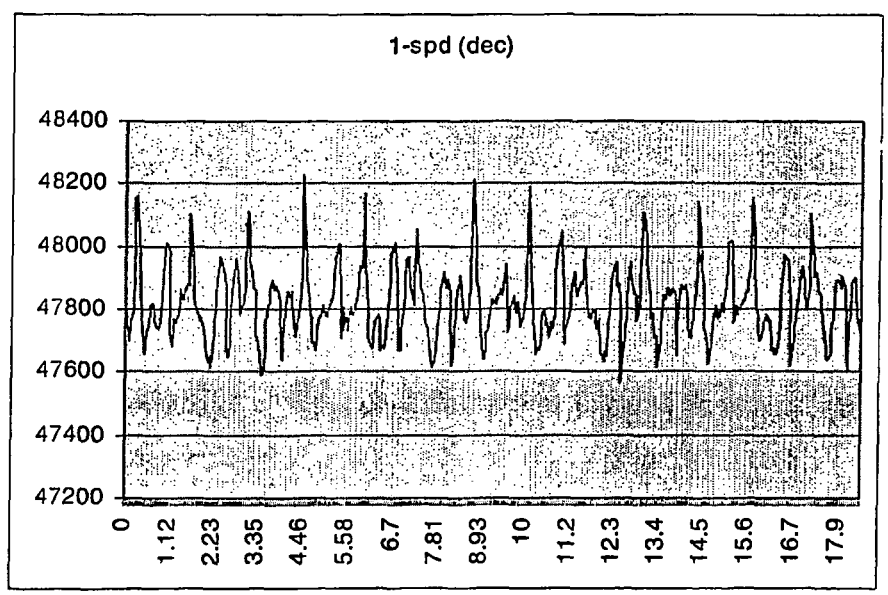
FIG. 13 illustrates the data used in FIG. 12 prior to performing a FT on the data.
Figure 14:
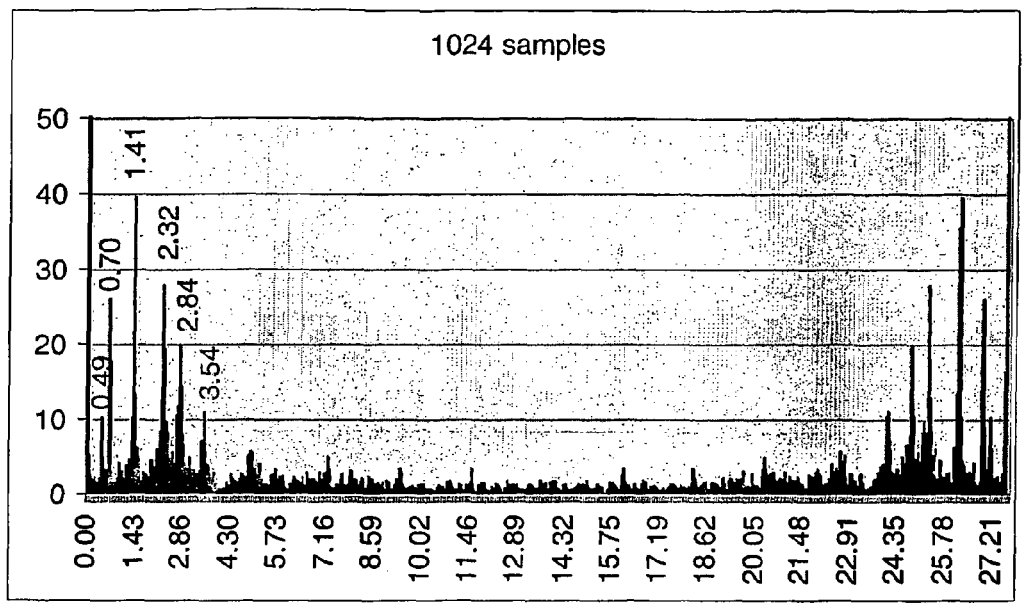
FIG. 14 illustrates data resolution with 1024 samples.

Providing more samples can result in finer frequency resolution after application of the FT to the speed data. More samples may be provided by increasing the length of time that samples are taken or by increasing the sampling rate. FIGS. 8 through 15 illustrate graphs generated by data taken at 17 samples per second. FIG. 8 illustrates the frequency analysis resolution of a valve actuator with a total of 128 samples. FIG. 9 illustrates the speed data of FIG. 8 prior to performing an FT on the speed data. FIG. 10 illustrates the frequency analysis resolution of a valve actuator with a total of 256 samples. FIG. 11 illustrates the speed data of FIG. 10 prior to performing an FT on the speed data. FIG. 12 illustrates the frequency analysis resolution of a valve actuator with a total of 512 samples. FIG. 13 illustrates the speed data of FIG. 12 prior to performing an FT on the speed data. FIG. 14 illustrates the frequency analysis resolution of a valve actuator with a total of 1024 samples. As can be seen, the resolution of the frequency analysis improves with an increasing number of samples.

Any type of frequency analysis known in the art may be used with the present invention. In the particular embodiment being described, FT was performed on speed data using a number of samples equaling $2^n$, where n is any whole number. Therefore, the total number of samples equals, for example, 128, 256, 512, 1024, 2048, 4096, 8192, etc. Therefore, if 3500 samples are taken, only 2048 of the samples may be used in the FT. In other embodiments, FT may be performed upon samples that do not precisely equal $2^n$. However, in those embodiments, leakage may become a concern. Techniques are known in the art for addressing leakage.

Additionally, in a particular embodiment, the FT utilizes samples that are taken at steady-state. Therefore, timing wheel 20 is turned at a relatively constant velocity. When rotary encoder 1 is incorporated within an electrically-driven valve actuator, timing wheel 20 will accelerate and decelerate during a period of time. The speed data generated during acceleration and deceleration data can be truncated, averaged, or windowed prior to performing FT. Transient frequency analysis is known in the art and may be applied, in lieu of truncating the data.

Truncation of the speed data may be performed by an algorithm designed to analyze the speed data prior to FT processing in order to remove any acceleration or deceleration data. Alternatively, speed data can be truncated to make the number of samples compatible with the FT $2^t$ requirement.

FT, as the phrase is used herein, encompasses a wide range of algorithms, including Fast Fourier transforms. FT, as used herein, covers four general families of Fourier transforms: continuous Fourier transforms, Fourier series, discrete-time Fourier transforms, and discrete Fourier transforms. There are also FT algorithms designed to handle approximations and non-uniform data. The discrete Fourier transform is most commonly used for digital signal processing. The phrase FT, as used herein, encompasses any algorithm compatible with the data generated.

The stroke time represents the maximum time during which samples may be taken. For example, with a valve actuator, the time it takes for a valve to move from open to closed positions, or vice-versa, is the maximum amount time during which speed data may be gathered. A valve may only be partially moved and, therefore, only a fraction of the stroke time may be available for speed data sampling. One exemplary way to increase the number of generated speed data samples includes increasing the sampling rate. Sampling rate is governed by the speed of timing wheel 20 and the number of timing marks 28. Rotary encoder 1 and 2 are capable of sampling rates much higher than 17 samples per second.

Yet another way to increase the number of generated data samples includes collecting data over multiple stroke times. Each new data set can be linked with the existing data collection until the sample count is sufficiently high to allow operation on it with FT. Once the data set is full, any new data samples can replace the oldest data samples, thus maintaining the freshest data set for analysis. Speed or position data may be stored, such as in a data table, for near real time or later frequency domain analysis.

FIG. 15 provides a table of the possible sampling rates and the resulting total number of samples that may be used for frequency analysis. In FIG. 15, the Incremental Pulse Frequency equals the sampling rate in Hz. The speed DS is the drive speed of the drive sleeve (DS) of a valve actuator. However, the speed DS could correlate to a rotary component of any device. The Bevel Set Speed Multiplier represents the speed increase resulting from the gear connecting the DS to the input shaft that drives input wheel 10. Input wheel 10 speed multiplier represents the increase in speed resulting from the gear ratio between gear 11 of input wheel 10 and pinion 25 of timing wheel 20.

An example of a rotary component of a rotary device is a drive sleeve of a valve actuator. An input shaft could interconnect via a bevel set of the drive sleeve to input wheel 10. Any manner of connections known in the art may be utilized to drive input wheel 10. As one possible example of data sampling, if the drive sleeve is turning at 200 rpm, and if the bevel set results in an approximate 4.8:1 speed increase, then the input shaft would be turning at 960 rpm. Therefore, input wheel 10 would be turning at 960 rpm. Input wheel 10 drives timing wheel 20. If a 51/38 spur increaser is utilized, then timing wheel 20 turns at approximately 1288 rpm. 1288 rpm divided by 60 equals the rotations per second of timing wheel 20. The exemplary timing wheel 20, as illustrated in FIG. 1, has 32 timing marks. However, should only 16 timing marks be utilized, then the rotations per second multiplied by the number of timing marks produces a sampling rate (Incremental Pulse Frequency) of 343 samples per second. In the same scenario, if timing wheel 20 has 32 timing marks, then the sampling rate is approximately 678 samples per second. The Nyquist frequency is half the sampling rate. The sampling rate multiplied by the stroke time, in seconds, equals the total number of samples that may be collected during a single, full stroke.

FIG. 15 illustrates the interplay of stroke time and sampling rate in calculating the accuracy of the frequency analysis. One alternative, if only short speed data runs are available, is to link together the short runs prior to performing FT on the data to increase the frequency resolution.

FIG. 15 was constructed using a Hanning Window to prevent distortions in the resulting frequency values caused by discontinuities in the speed signal at the start and end of the data set. Other possible windows include rectangular, Blackman, Hamming, Kaiser, Exponential, and Flat Top. However, any window known in the art may be used to evaluate the speed data. It is also known in the art how to perform frequency analysis without the use of windows. Any approach known in the art for performing frequency analysis may be used with the present invention.

Frequency data may be evaluated on a case-by-case basis to determine what the peak locations and magnitude suggest with respect to a valve actuator. Alternatively, the frequency analysis may be compared to known frequency analysis signatures to determine the health of a valve actuator or other rotary equipment.

Figure 16:
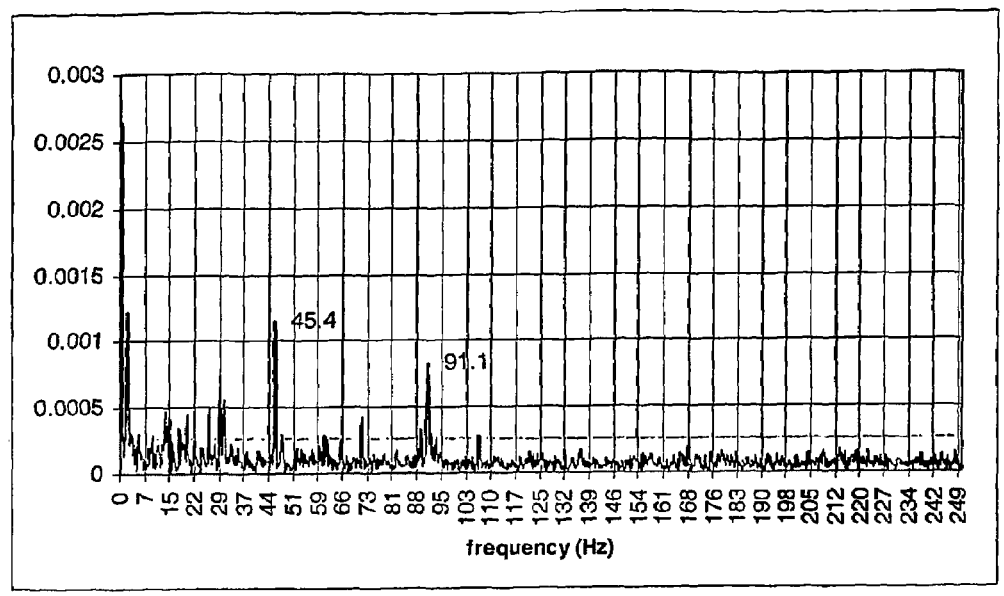
FIG. 16 is an example of frequency domain data obtained at 26 rotation per minute (rpm)
Figure 17:
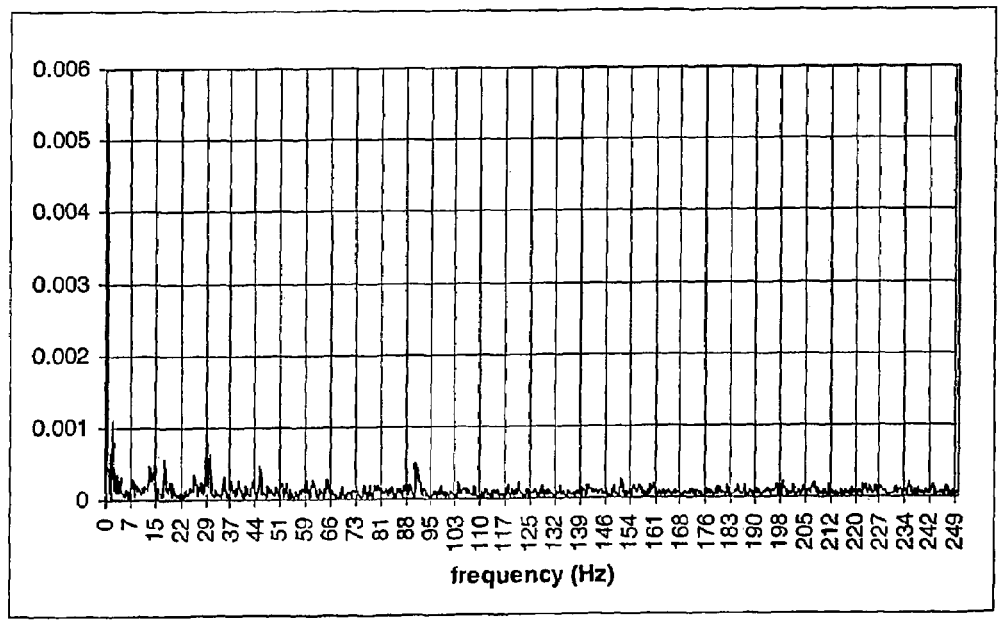
FIG. 17 is another example of frequency domain data obtained at 26 rpm.
Figure 18:
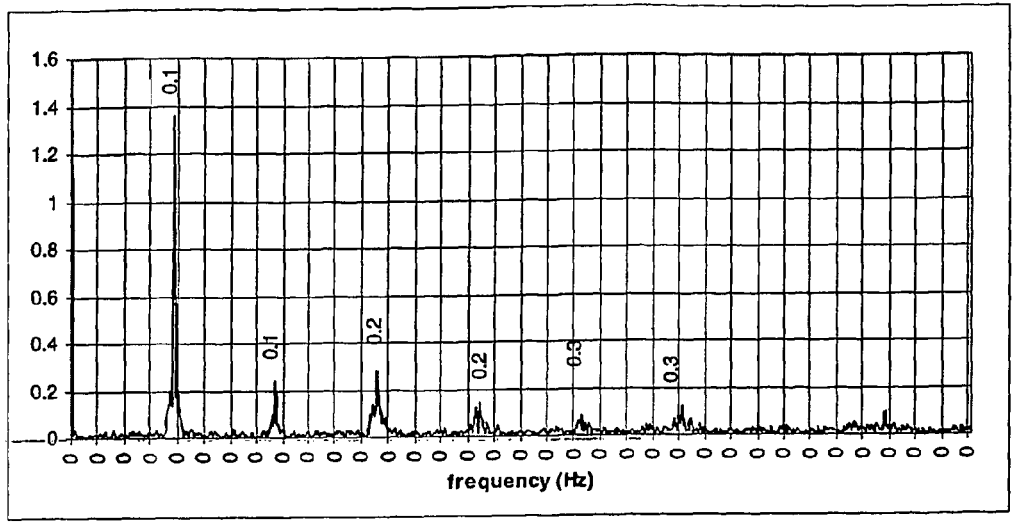
FIG. 18 is an example of frequency domain data obtained at 18 rpm.
Figure 19:
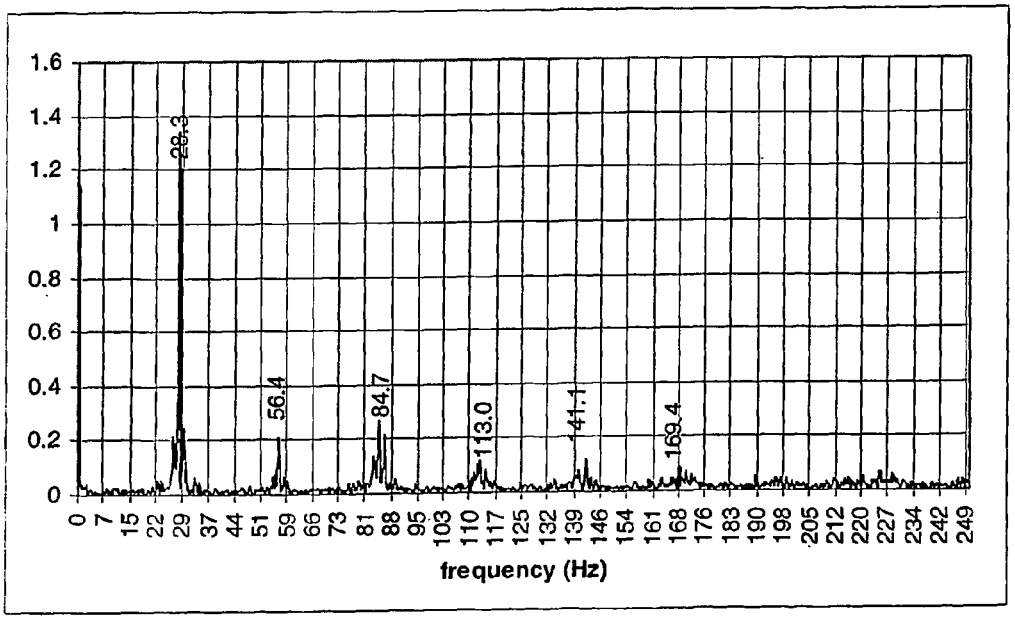
FIG. 19 is another example of frequency domain data obtained at 18 rpm.

FIGS. 16 through 19 illustrate representative frequency analysis that may be used for comparisons. FIGS. 18 and 19 illustrate speed variations that generally vary depending upon the rotary speed of the valve actuator or other rotary device. The data for FIGS. 16 and 17 were generated on an actuator that was operating at 26 rotations per minute (rpm) steady state. The data for FIGS. 18 and 19 were generated on an actuator that was operating at 18 rpm steady state. FIGS. 16 and 19, and FIGS. 17 and 18, respectively, utilize the same encoder pinion adapter. FIG. 16 has significant peaks at 45.4 Hz and 91.1 Hz. The significant peaks of FIG. 19 are much more pronounced and numerous. Multiple problems within a valve actuator, or other rotary equipment, may harmonize to appear as a single peak in the frequency domain. Frequency analysis at different operating speeds can unmask potential problems that hide within a single peak at one speed, but show up as multiple peaks at other speeds.

The rotary encoder of the present invention has been described as a multi-wheel absolute encoder. The rotary encoder may also be a single wheel absolute encoder, or an incremental encoder. For example, timing wheel 20 could be integrated into the same wheel as input wheel 10. Input wheel 10 could then function as an incremental encoder, as well as a timing wheel. Furthermore, the coding sections of encoding wheels 30 through 110 can be integrated into the input wheel 10, as is known in the art. Input wheel 10 can then function as a single wheel absolute encoder. Input wheel 10 may designed to mate with the end of an input shaft or, alternatively, input wheel 10 may be mounted around an input shaft, such as in the longitudinal center of the input shaft. However, input wheel 10 may be mounted at any point along the length of an input shaft.

Previously, the frequency analysis has been discussed relative to speed data. An additional data embodiment includes torque data. In valve actuators where torque is measured, the oscillations in torque may be transformed into the frequency domain. Where the output torque delivered to a valve stem is monitored, the torque data could also be analyzed in the frequency domain. A processor incorporated in the valve actuator or remote from the valve actuator could convert the torque data into the frequency domain in any of the ways discussed above with respect to speed data, or by any technique known in the art. The frequencies may then be identified with drive-train components and the operator provided with an indication of the health of the valve actuator.

Another data embodiment includes thrust data. By way of example, an electric motor of a valve actuator is coupled to the worm of a worm/wormgear in the drive-train. The axial thrust of the worm is monitored to read on the torque delivered by the wormgear. A processor incorporated in the valve actuator or remote from the valve actuator can convert the thrust data into the frequency domain similar to any of the ways discussed above with regard to speed data, or by any technique known in the art. The frequencies may then be identified with drive-train components—either by the operator or by a computer program. Thus, a diagnosis of the valve actuator is provided. Additionally, multiple thrust sensors may be utilized.

An additional data embodiment includes vibration data. For example, eight accelerometers are placed in a variety of locations in a valve actuator. All eight of the accelerometers would read on the same vibrations in the valve actuator. However, the accelerometers closest to a given source of vibration would have more intense signals. Viewing the vibration data from all eight sensors in the frequency domain can allow for pinpointing sources of vibration. The frequencies of the vibrations may then be correlated with drive-train components. Thus, an operator may be warned of any impending problems with the valve actuator.

Any number of sensors in any of the embodiments may be utilized. For example, more than one speed sensor may be utilized. Additionally, multiple sensors of varying types may be utilized. For example, a valve actuator may include a rotary encoder, such as rotary encoder 1. The valve actuator may also include an axial thrust sensor. Frequency analysis can be performed on the speed data generated by timing wheel 20, on the thrust data, or on both.

The rotary device or valve actuator to be monitored by the present invention may be driven by an electric motor, hydraulic pressure, an engine, a hand wheel, or any other driving means known in the art.

Although the foregoing description contains many specifics, these are not to be construed as limiting the scope of the present invention, but merely as providing certain exemplary embodiments. Similarly, other embodiments of the invention can be devised that do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

The invention claimed is:

1. A rotary encoder for use with a valve actuator, the rotary encoder comprising:
   a plurality of encoding wheels, each of the plurality of encoding wheels comprising a plurality of coding sections for encoding multiple positions of the valve actuator;
   a timing mechanism for generating rotational speed data from the valve actuator, wherein the timing mechanism comprises a timing wheel having a plurality of timing marks equally spaced in a concentric pattern around the timing wheel;
   a plurality of double set of redundant encoder sensors for monitoring each coding section of the plurality of coding sections of each of the plurality of encoding wheels, wherein each double set of redundant encoder sensors comprises a first sensor positioned on a first side of a corresponding coding wheel and a second sensor positioned on a second, opposing side of the corresponding coding wheel, and wherein the first sensor and the second sensor each comprise an emitter and a detector positioned adjacent to the emitter;

a double set of redundant timer sensors for monitoring the plurality of timing marks of the timing wheel, wherein the double set of redundant timer sensors comprises a first sensor positioned on a first side of the timing wheel and a second sensor positioned on a second, opposing side of the timing wheel, and wherein the first sensor and the second sensor each comprise an emitter and a detector positioned adjacent to the emitter; and a processor in communication with the plurality of double set of redundant encoder sensors of each of the plurality of encoding wheels and the double set of redundant timer sensor of the timing mechanism, wherein the processor is operable to transform the rotational speed data generated by the timing mechanism from a time domain to a frequency domain to generate frequency data, and to compare the generated frequency data with a baseline frequency data.

2. The rotary encoder of claim 1, wherein the timing wheel is integrated with an encoding wheel, wherein an outer portion of the encoding wheel comprises the plurality of timing marks of the timing wheel and an inner portion of the encoding wheel comprises at least one coding section.

3. The rotary encoder of claim 1, wherein the timing wheel is separate and distinct from the plurality of encoding wheels, and wherein the timing wheel is operably connected to the plurality of encoding wheels.

4. The rotary encoder of claim 1, wherein the plurality of encoding wheels is configured to allow decoding using Viterbi logic.

5. The rotary encoder of claim 1, wherein the plurality of double set of encoder sensors and the double set of redundant timer sensors are able to self-test via direct transmission.

6. The rotary encoder of claim 1, wherein each set of the plurality of double set of encoder sensors and the double set of redundant timer sensors is parallel to another set of sensors.

7. The rotary encoder of claim 1, wherein the rotary encoder is an absolute encoder or an incremental encoder.

8. The rotary encoder of claim 1, wherein one of the one or more encoding wheels is operable for incremental encoding and wherein at least one of the one or more encoding wheels is operable for absolute encoding.

9. The rotary encoder of claim 1, wherein at least one of the plurality of double set of encoder sensors is operable to monitor multiple coding sections.

10. The rotary encoder of claim 1, wherein at least one coding section of the plurality of coding sections comprises multiple coding sections asymmetrically orientated in relation to each other.

11. The rotary encoder of claim 1, wherein the rotary encoder comprises an absolute encoder, the rotary encoder further comprising an input wheel configured to receive rotary input, wherein the timing wheel is driven by the input wheel.

12. The absolute encoder of claim 11, wherein the plurality of double set of encoder sensors and the double set of redundant timer sensors are selected from the group consisting of optical sensors, Hall effect sensors, magnetic sensors, or electrical contacts.

13. The absolute encoder of claim 11, wherein each of the plurality of double set of encoder sensors and the double set of redundant timer sensors is able to test each other when activated.

14. A valve actuator comprising:
the absolute encoder of claim 11; and
a drive train adapted to drive the absolute encoder.

15. The valve actuator of claim 14, further comprising a processor adapted to generate alarms upon failure of a component of the absolute encoder.

16. The valve actuator of claim 15, wherein the processor is adapted for evaluating the impact of the component failure on a position indicated by the absolute encoder.

17. The valve actuator of claim 16, further comprising a valve actuator motor, wherein the processor is adapted to shutdown the valve actuator motor.

18. The valve actuator of claim 16, wherein the processor is adapted to generate an alarm.

19. The valve actuator of claim 15, wherein component failure comprises one sensor of the plurality of double set of encoder sensors or the double set of redundant timer sensors failing to operate or operating at a wrong time.

20. The valve actuator of claim 15, wherein the processor is further adapted to generate alarms if a discontinuity is indicated in a record of valve positions.

21. The valve actuator of claim 14, wherein the processor is a part of the absolute encoder.

22. The valve actuator of claim 14, wherein a drive sleeve of the drive-train is adapted to drive the absolute encoder.

23. A method of operating a valve actuator, the method comprising:
turning an input wheel of the rotary encoder of claim 1 with a drive train of the valve actuator;
generating position data from the plurality of encoding wheels with the plurality of double set of redundant encoder sensors;
generating rotational speed data from the timing wheel with the double set of redundant timer sensors; and
performing frequency domain analysis on the rotational speed data.

* * * * *